US012775804B2

(12) United States Patent
Kumar

(10) Patent No.: US 12,775,804 B2
(45) Date of Patent: Oct. 27, 2026

(54) MULTI-CHANNEL CONVERSATION PROCESSING

(71) Applicant: Oracle International Corporation, Redwood Shores, CA (US)

(72) Inventor: Vivek Kumar, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 18/807,596

(22) Filed: Aug. 16, 2024

(65) Prior Publication Data

US 2024/0404513 A1 Dec. 5, 2024

Related U.S. Application Data

(63) Continuation of application No. 17/668,968, filed on Feb. 10, 2022, now Pat. No. 12,094,458.

(51) Int. Cl.
*G10L 15/08* (2006.01)
*G06F 40/289* (2020.01)
(Continued)

(52) U.S. Cl.
CPC ........ *G10L 15/1815* (2013.01); *G06F 40/289* (2020.01); *G06F 40/30* (2020.01); *G10L 15/16* (2013.01); *G10L 15/1822* (2013.01); *H04L 51/212* (2022.05); *G06F 40/279* (2020.01); *G06F 40/35* (2020.01); *G10L 15/183* (2013.01);
(Continued)

(58) Field of Classification Search
None
See application file for complete search history.

(56) References Cited

U.S. PATENT DOCUMENTS 9,715,494 B1 * 7/2017 Budinsky .............. G06F 40/253
10,409,913 B2 * 9/2019 Bhatt ...................... G10L 15/26
(Continued)

FOREIGN PATENT DOCUMENTS

WO 2016/179055 A1 11/2016
WO 2021/142285 A1 7/2021

OTHER PUBLICATIONS

"How to Improve Customer Service with Unstructured Data," Retrieved at https://getthematic.com/insights/customer-service-unstructured-data/, Retrieved on Nov. 26, 2021, pp. 1-14.
(Continued)

*Primary Examiner* — Richard Z Zhu
(74) *Attorney, Agent, or Firm* — Invoke

(57) ABSTRACT

Techniques for extracting data from conversations across different types of communication channels are disclosed. A system applies a set of rules to extract data from conversations based, at least in part, on a type of communication channel used for conducting the conversation. The system applies a machine learning model to recognize semantic content in conversations. The system divides conversations into conversation segments and classifies the conversation segments based on the semantic content. The system selects conversation segments to be extracted based on the semantic content and the type of communication channel over which a conversation is conducted. The system maps conversation segments from different conversations conducted on different types of communication channels to a same set of transactions.

24 Claims, 15 Drawing Sheets

(51) Int. Cl.

| | |
|---|---|
| ***G06F 40/30*** | (2020.01) |
| ***G10L 15/16*** | (2006.01) |
| ***G10L 15/18*** | (2013.01) |
| ***H04L 51/212*** | (2022.01) |
| ***H04L 51/56*** | (2022.01) |
| *G06F 40/279* | (2020.01) |
| *G06F 40/35* | (2020.01) |
| *G10L 15/183* | (2013.01) |
| *G10L 15/22* | (2006.01) |

(52) U.S. Cl.
CPC ........ *G10L 2015/225* (2013.01); *H04L 51/56* (2022.05)

(56) References Cited

U.S. PATENT DOCUMENTS

| | | | | |
|---|---|---|---|---|
| 10,536,411 | B2 | 1/2020 | Deets et al. | |
| 10,796,697 | B2 | 10/2020 | Somech et al. | |
| 10,868,785 | B2 | 12/2020 | Hosseinisianaki et al. | |
| 10,923,121 | B2 | 2/2021 | Locascio et al. | |
| 10,943,072 | B1 | 3/2021 | Jaganmohan | |
| 11,108,710 | B2 | 8/2021 | Narayan et al. | |
| 11,122,024 | B2 | 9/2021 | Vaughn et al. | |
| 11,533,281 | B2 | 12/2022 | Larson et al. | |
| 11,595,327 | B2 * | 2/2023 | Rose | H04L 51/48 |
| 11,621,928 | B2 | 4/2023 | Marzorati et al. | |
| 11,699,039 | B2 * | 7/2023 | Somech | H04L 67/535 704/9 |
| 11,727,219 | B2 | 8/2023 | Evermann | |
| 11,756,056 | B2 | 9/2023 | Advani | |
| 11,769,498 | B2 | 9/2023 | Locascio et al. | |
| 2012/0215535 | A1 * | 8/2012 | Wasserblat | H04M 3/5191 704/E15.001 |
| 2015/0026279 | A1 * | 1/2015 | Casanova | H04L 51/10 709/206 |
| 2019/0245974 | A1 * | 8/2019 | Dwyer | G10L 15/02 |
| 2020/0344194 | A1 * | 10/2020 | Hosseinisianaki | G06F 40/30 |
| 2023/0177269 | A1 * | 6/2023 | Lundin | G06F 40/289 715/204 |

OTHER PUBLICATIONS

"Introducing Chat Analytics—Analyze chat & support conversations in Thematic," Retrieved at https://getthematic.com/insights/introducing-chat-analytics/, Retrieved on Feb. 15, 2022, pp. 1-5.

"Product|Thematic," Retrieved at https://getthematic.com/product/, Retrieved on Feb. 15, 2022, pp. 1-4.

"Putting You in Control of Your Gaming Experience," Retrieved at https://news.xbox.com/en-us/2019/10/14/our-vision-for-content-filtration/, Retrieved on Oct. 14, 2019, pp. 1-7.

"Contact Lens for Amazon Connect," Retrieved at https://aws.amazon.com/connect/contact-lens/, Retrieved on Nov. 26, 2021, pp. 1-16.

"Data lifecycle," Retrieved at https://cloud.google.com/architecture/data-lifecycle-cloud-platform, Retrieved on Nov. 26, 2021, pp. 1-16.

"How AI-assisted Text Analytics Reveals Actionable Insights," Retrieved at https://www.skellam.ai/blog/how-ai-assisted-text-analytics-reveals-actionable-insights, Retrieved on Jul. 6, 2020, pp. 1-4.

"Improve Your Chatbot Accuracy by Monitoring User Activity," Retrieved at https://developers.sap.com/tutorials/conversational-ai-monitoring.html, Retrieved on Mar. 8, 2021, pp. 1-18.

"Machine learning-based customer insights with Contact Lens for Amazon Connect," Retrieved at https://aws.amazon.com/blogs/contact-center/contact-lens-for-amazon-connect-ga/ , Retrieved on Nov. 26, 2021, pp. 1-6.

"Text Mining: How to Extract Valuable Insights From Text Data," Retrieved at https://www.g2.com/articles/text-mining, Retrieved on Jun. 29, 2021, pp. 1-13.

"What is Text Analysis Techniques, Applications & Examples," Retrieved at https://levity.ai/blog/what-is-text-analysis, Retrieved on Sep. 16, 2021, pp. 1-12.

* cited by examiner

MULTI-CHANNEL CONVERSATION PROCESSING

INCORPORATION BY REFERENCE; DISCLAIMER

Each of the following applications are hereby incorporated by reference: application Ser. No. 17/668,968 filed on Feb. 10, 2022. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to channel-based conversation processing. In particular, the present disclosure relates to applying one or more machine learning models to conversations across multiple channels of multiple channel types to classify conversations, at least in part, according to the type of channel on which the conversation takes place.

BACKGROUND

Many different platforms exist for conducting conversations digitally using various electronics devices. Short message service (SMS), also referred to as "texting," is technology that allows users to exchange short, alpha-numeric messages between digital devices, such as cellular phones. Multimedia messaging service (MMS) is a technology to send additional content, such as attached files, images, and emojis between digital devices. Typically, cellular telephony service providers include SMS and MMS messaging services in subscription plans using their networks. Electronic mail (email) is another method of exchanging messages using digital devices. Unlike SMS and MMS, email includes particular header fields, transmission functions, and archival functions. Email addresses include names and domains, while SMS and MMS messages may be sent to cellular phone numbers. In addition, email clients typically display messages as plain text or in HTML. Other platforms for conducting conversations digitally include instant messenger (IM) applications, and chat platforms that allow a chat function to be initiated in association with a web page or a video or audio call. Each type of digital communication channel has different standards for addressing, initiating, conducting, terminating, and storing conversations.

An individual or work group of an enterprise may maintain multiple conversations associated with a single transaction over multiple different communication channels over extended periods of time, such as over a period of 6 months or more. For example, the process of initiating and closing a deal for a sales opportunity may involve multiple employees from multiple different divisions within a company discussing the sales opportunity over the course of months and over four or five different communication channels. While conversations within a communication channel may be stored in a data repository, different communication channels are stored separately. Searching for content associated with a particular transaction, such as a particular sales opportunity, involves separately searching each communication channel of each communication channel type, among each user who participated in the particular transaction over the course of development of the transaction. A human user typically does not have access to the data underlying each conversation associated with a transaction. In addition, the amount of data that would need to be searched makes it impractical for a human user or group of users to perform the search.

In addition, when a human searches for related content in electronic documents, humans rely on searching for key words or phrases. However, while some messages in conversations may include key words or phrases associated with a particular transaction, other conversations do not include any key words or phrases that a human would associate with a particular transactions. Accordingly, a human user may not be capable of identifying a relationship of one conversation on one communication channel, which does not name a particular transaction, to another conversation on another communication channel that may or may not name the particular transaction.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
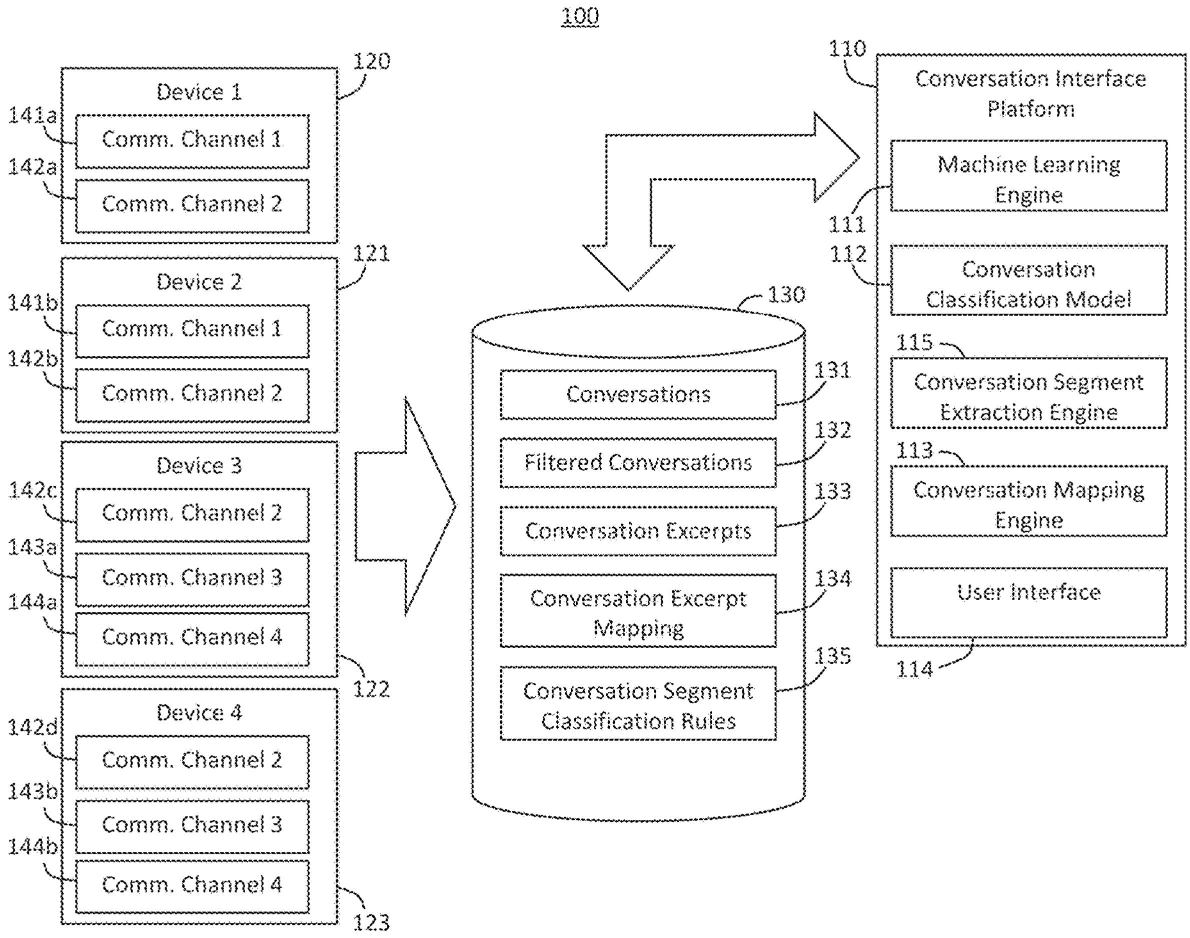
FIGS. 1A-1D illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. CHANNEL-BASED CONVERSATION CLASSIFICATION
4. MULTI-CHANNEL CONVERSATION MAPPING
5. MACHINE LEARNING MODEL TRAINING

6. EXAMPLE EMBODIMENT: CHANNEL-BASED CONVERSATION CLASSIFICATION
7. EXAMPLE EMBODIMENT: MULTI-CHANNEL CONVERSATION MAPPING
8. COMPUTER NETWORKS AND CLOUD NETWORKS
9. MISCELLANEOUS; EXTENSIONS
10. HARDWARE OVERVIEW

1. General Overview

People communicate over various different types of communication channels such as text messaging, electronic mail (email), web-based chat applications, verbal communication over the phone, verbal communication over the Internet, and in-person verbal communication (that may be recorded). The type, content, length, and significance of the conversation often varies based on the type of communication. As an example, people may frequently engage in "small talk" (e.g., about the weather) over a web-based chat application but rarely engage in "small talk" over email.

One or more embodiments select and apply a set of rules for extracting data from a conversation based at least on the type of communication channel used for conducting the conversation. The set of communication channel type-specific rules may be implemented using a machine learning model. The system trains the machine learning model based on a training data set of historical conversation data corresponding to multiple conversations across multiple types of communication channels. The trained machine learning model then uses varying criteria for data extraction based on the type of communication channel. As an example, the machine learning model is trained such that different data sets may be extracted from the same conversation depending on the communication channel type used for conducting the conversation.

One or more embodiments determine that a set of conversations, across different types of communication channels, correspond to a same transaction. The system extracts data from each of the set of conversations and stores the extracted data in association with the same transaction. The transaction may include a transaction name. For example, a transaction name may include a geographic location and type of the transaction, such as "sales opportunity at XYZ Software." Embodiments apply a trained machine learning model to conversation segments in multiple, different communication channels, of different communication channel types, to associate conversation segments from the different communication channel types with the same candidate transaction. The machine learning model receives as input values various attributes associated with the conversations, such as: communication channel type, communication channel name (if applicable), participants, semantic content, metadata associated with the conversation, language in which the conversation is conducted, and geographic information contained in, or associated with, the conversation. For example, one conversation on one channel may include, as semantic content, a name of a transaction, such as "here's the contact info. for the sales opportunity at XYZ software." However, another conversation on a different communication channel may not include a name of a transaction (e.g., "here are the documents you asked for."). The machine learning model associates both the conversation segment including the name of the transaction and the conversation segment that does not include the name of the segment with the same transaction based on the additional attributes associated with the respective conversations.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a conversation interface platform 110, a plurality of digital communication devices 120, 121, 122, and 123, and a data repository 130. The conversation interface platform 110 analyzes conversations 131 conducted over communication channels 141, 142, 143, and 144. In the example illustrated in FIG. 1A, the communication channel 141 includes clients 141*a* and 141*b* installed on devices 120 and 121. For example, the communication channel 141 may be an SMS application or MMS application. The communication channel 142 may be an instant messaging (IM) application having clients 142*a*, 142*b*, 142*c*, and 142*d* operating on devices 120 and 121, which may be cellular phones, and devices 122 and 123, which may be laptops or personal computers. Communication channel 143 may be an email application having clients 143*a* and 143*b* installed on, or accessed via a web page by, computing devices 122 and 123. Communication channel 144 may be an audio and video conferencing application having a chat function. Computing devices 122 and 123 may run instances 144*a* and 144*b* of the audio and video conferencing application.

While FIG. 1A provides examples of communication channels 141-144, embodiments are not limited to the examples illustrated or described above. Embodiments encompass any system that stores conversations using different types of communication channels. The different types of communication channels have different functionality and different standards of operation. Examples of communication channel types include: email, SMS, MMS, instant messaging (IM), cloud-based applications (such as SLACK) that combine functionality of MMS and IM by allowing messages to be generated both on a personal computer and a cellular telephone, chat applications that allow real-time communication on a personal computer, and audio and video conferencing applications (that may include chat functions). Examples of communication channels include: an email thread originated by one user that is continued when users "reply" to the initial email or subsequent emails in the thread; messages in an SMS thread between two cell phone numbers, messages in an MMS thread between a certain set of cell phone numbers, messages between a certain set of users in an IM application, and a channel having a particular channel name in a cloud-based application, in which users may enter or exit the channel over time.

In one or more embodiments, a conversation interface platform 110 refers to hardware and/or software configured to perform operations described herein for analyzing conversation content across multiple types of communication channels, classifying conversation segments according to channel type and semantic content, and mapping conversation extracts to candidate transactions. Examples of operations for channel-based conversation classification are described below with reference to FIG. 2.

In an embodiment, the conversation interface platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the conversation interface platform 110. Alternatively, or additionally, a data repository 130 may be implemented or executed on a computing system separate from the conversation interface platform 110. A data repository 130 may be communicatively coupled to the conversation interface platform 110 via a direct connection or via a network.

Information describing conversations 131, filtered conversations 132, conversation excerpts 133, a conversation excerpt mapping 134, and conversation segment classification rules 135 may be implemented across any of components within the system 100. However, this information is illustrated within the data repository 130 for purposes of clarity and explanation.

The conversation interface platform 110 includes a machine learning engine 111 to train one or more machine learning models. A conversation classification model 112 performs one or more classifications of conversations and conversation segments. The conversation classification model 112 may include two or more separate machine learning models. For example, the machine learning engine 111 may train one machine learning model to classify semantic content in a conversation. The semantic recognition machine learning model recognizes the meaning and context of words and phrases. The machine learning engine 111 may train another machine learning model to filter conversation content based on the semantic meaning. The filtering machine learning model may additionally filter conversation content based on metadata associated with a conversation. In one or more embodiments, the filtering machine learning model applies a different set of rules to filter content according to a channel in which the conversation is held. The machine learning engine 111 may train another machine learning model to divide the conversations 131 or filtered conversations 132 into segments based on the semantic content within different portions of the conversation.

As an example, the conversation classification model 112 may perform semantic recognition by classifying semantic content of conversation segments in a conversation as "small talk," "sales-related," "project related," and "personnel-related." The conversation classification model 112 may classify conversations and portions of conversations as being related to one or more of hundreds or thousands of potential categories. The conversation classification model 112 may perform content filtering by labeling as "non-relevant" a particular conversation segment in which the conversation classification model 112 identified the semantic content as being "small-talk" based on a discussion of the weather in the semantic content of the segment. The conversation interface platform 110 may omit conversation segments labeled "irrelevant" from the filtered conversations 132 that are used to map conversation segments to candidate transactions. The conversation classification model 112 may divide the filtered conversations 132, with the portions labeled "irrelevant" omitted, into segments based on the semantic content in the segments. The conversation mapping engine 113 maps the segments to candidate transactions based on the semantic content and/or metadata associated with the segments.

Upon identifying the semantic content in the conversations 131, the conversation classification model 112 is applied to semantic content of the filtered conversations to generate conversation segments that are divided based on semantic content. For example, a conversation may include a first portion that is related to one transaction and a second portion related to another transaction. The conversation classification model 112 identifies the different portions based on the semantic content in the portions and generates corresponding conversation segments. The conversation classification model 112 may also be applied to metadata associated with the conversations, in addition to the semantic content, to generate the conversation segments. The conversation interface platform 110 generates conversation excerpts 133 based on the conversation segments identified by the conversation classification model 112. For example, the conversation interface platform 110 may generate an index with start times and stop times of the conversation segments and a description of semantic and/or metadata content associated with the segment. Alternatively, the conversation interface platform 110 may generate copies of the conversation segments and store the corresponding excerpts in separate memory locations, such that the conversation interface platform 110 may access a particular excerpt by accessing a particular memory location.

Although the conversation classification engine was described above as generating conversation segments from filtered conversations 132, embodiments include filtering conversation content after generating the conversation segments.

Figure 1B:
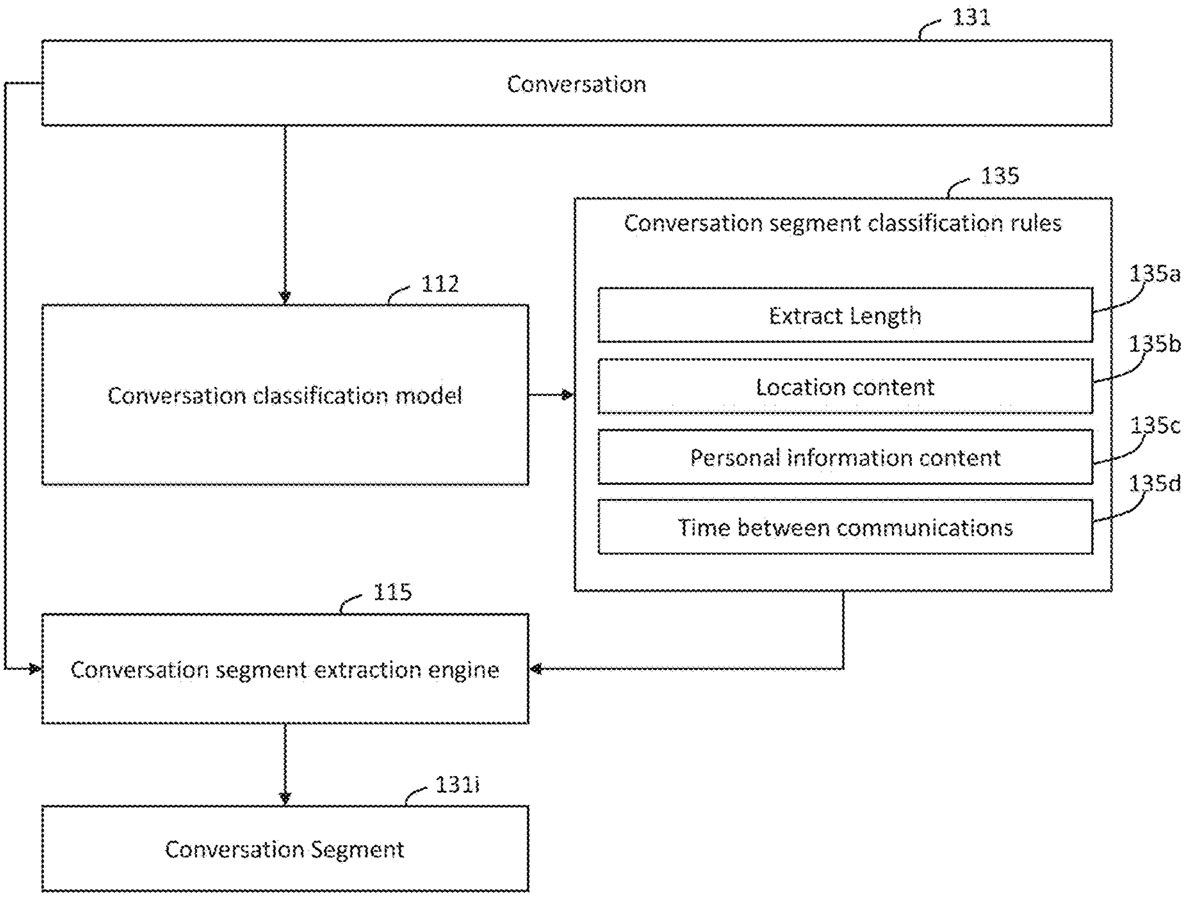

As illustrated in FIG. 1B, the conversation classification model 112 may apply a different set of rules to different conversations, based on the communication channel over which the communication takes place, to determine whether a particular conversation segment is filtered out of a conversation or mapped to a transaction. For example, based on the reasoning that text messages are more likely to include personal content than email messages and enterprise-maintained IM messages, the conversation classification model 112 may be trained to leave a particular example of semantic content unfiltered in an IM conversation that is filtered from an SMS text conversation. Examples of different rules that are applied to conversations based on a communication channel over which the conversation takes place are: a rule 135*a* specifying that an extract should be a particular length for a particular communication channel, a rule 135*b* specifying whether semantic content describing geographic locations should be filtered out of a conversation, a rule 135*c* specifying whether, and what type of, personal information content should be filtered out of a conversation, and a rule 135*d* specifying how much time is allowed between responses in a communication while still maintaining two or more communications in the same conversation segment.

According to the embodiment illustrated in FIG. 1B, the conversation classification model 112 selects a particular set of characteristics (e.g., a particular extract length, particular content filtered out of a conversation, and particular communications included in a conversation segment) based on one or more attributes of a conversation, including the communication channel over which the conversation occurs. A conversation segment extraction engine 115 applies the rules to the conversation to generate conversation segments, such as segment 131*i*, based on the rules. The conversation segment extraction engine 115 further extracts particular segments to map the segments to candidate transactions.

A conversation mapping engine 113 maps conversation excerpts 133 to candidate transactions including transaction names. For example, one conversation may have two conversation segments: a conversation segment associated with a transaction "NewCo Sales Opportunity" and another segment associated with a transaction "OldCo Sales Opportunity." The conversation mapping engine 113 maps the first segment to the transaction named "NewCo Sales Opportunity" and the second segment to the transaction named "OldCo Sales Opportunity."

According to one embodiment, the conversation classification model 112 analyzes conversation content and identifies sets of conversation segment classification rules 135 for filtering, segmenting, and matching segments to transactions based on a communication channel of the conversation. For example, the conversation classification model 112 may identify one set of rules for classifying conversation segments of an email conversation and another set of rules for classifying conversation segments of an MMS text conversation.

The conversation interface platform 110 includes a user interface 114. In an embodiment in which the machine learning engine 111 trains the conversation classification model 112 via supervised training, the user interface 114 allows a user to provide an input as to whether one or more classification labels generated by a conversation classification model 112 being trained are accurate. The user feedback is provided to the machine learning engine 111 to further train the conversation classification model 112. The user interface 114 also provides a graphical user interface (GUI) allowing users to select a particular transaction name. The conversation interface platform 110 generates a GUI including interface elements for the conversation excerpts 133, among the different channels and channel types, that are mapped to the transaction name.

In one or more embodiments, interface 114 refers to hardware and/or software configured to facilitate communications between a user and the conversation interface platform 110. Interface 114 renders user interface elements and receives input via user interface elements. Examples of interfaces include a GUI, a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 114 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 114 is specified in one or more other languages, such as Java, C, or C++.

Figure 1C:
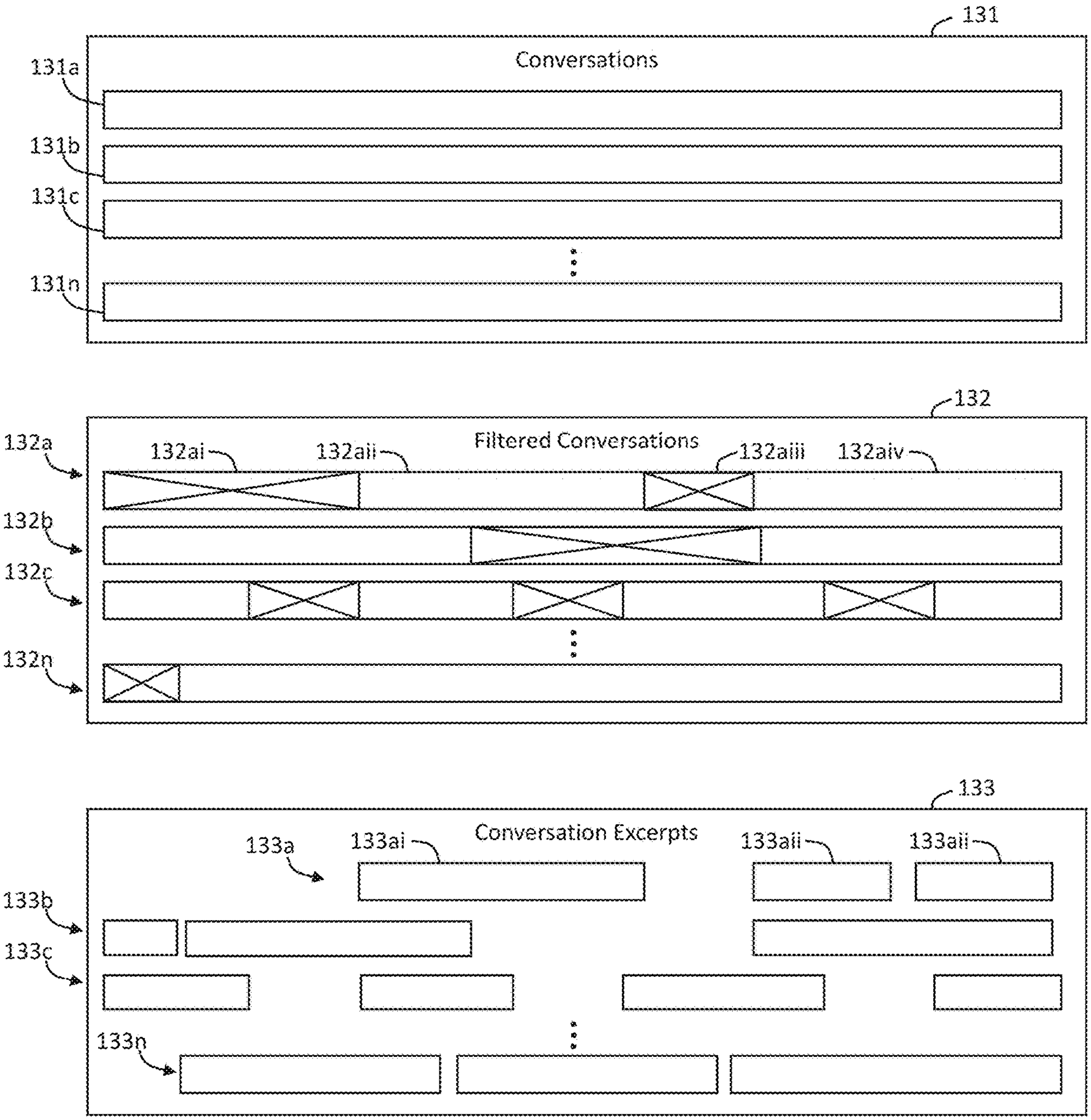

FIG. 1C illustrates examples of conversations 131, filtered conversations 132, and conversation excerpts 133. Conversations 131 include conversation 131*a*, conversation 131*b*, conversation 131*c*, through conversation 131*n*. The conversations 131*a*-131*n* are digitally-stored representations of conversations conducted over different communication channel types. For example, conversation 131*a* may be a digitally-stored series of text communications conducted over an SMS channel between two cellular telephone devices. Conversation 131*b* may be a digitally-stored string of email messages, where a first message in the conversation is initiated by a particular user, and each subsequent message in the conversation is generated by "replying" to another message in the conversation. Conversation 131*c* may be a digitally-stored string of messages, images, and files associated with an IM channel of a particular name. Over the life of the IM channel, different users may enter and leave the channel (e.g., by joining and leaving the channel), and the conversation among different sets of users over time.

The conversation classification model 112 generates filtered conversations 132*a*-132*n* by identifying and filtering content from the conversations 131*a*-131*n* that does not meet a threshold level of relevance to any transaction. For example, the conversation classification model 112 may identify portion 132*ai* of conversation 131*a* as being small talk, such as a discussion of personal items, weather, or other interests that are not related to a particular transaction. The conversation classification model 112 may identify the portion 132*aii* of conversation 131*a* as pertaining to a particular transaction "December sales results." The conversation classification model 112 may identify portion 132*aiii* of conversation 131*a* as being not relevant to a named transaction, such as a discussion of lunch plans. The conversation classification model 112 may identify the portion 132*aiv* of conversation 131*a* as pertaining to particular transactions "January sales goals" and "February sales goals."

The conversation classification model 112 generates conversation excepts 133 by omitting from the conversations 131 the content that is determined to be irrelevant to any transaction, and by dividing the remaining content into segments based on semantic and/or metadata content associated with the segments. For example, the conversation classification model 112 generates a set of excerpts 133*a* from conversation 131*a*. The set of excerpts 133*a* includes a first excerpt 133*ai* including first semantic content, excerpt 133*aii* including second semantic content, and excerpt 133*aiii* including third semantic content. The conversation classification model 112 generates sets of excerpts 133*b*, 133*c*, to 133*n* associated with conversations 131*b*, 131*c*, to 131*n*, respectively.

Figure 1D:
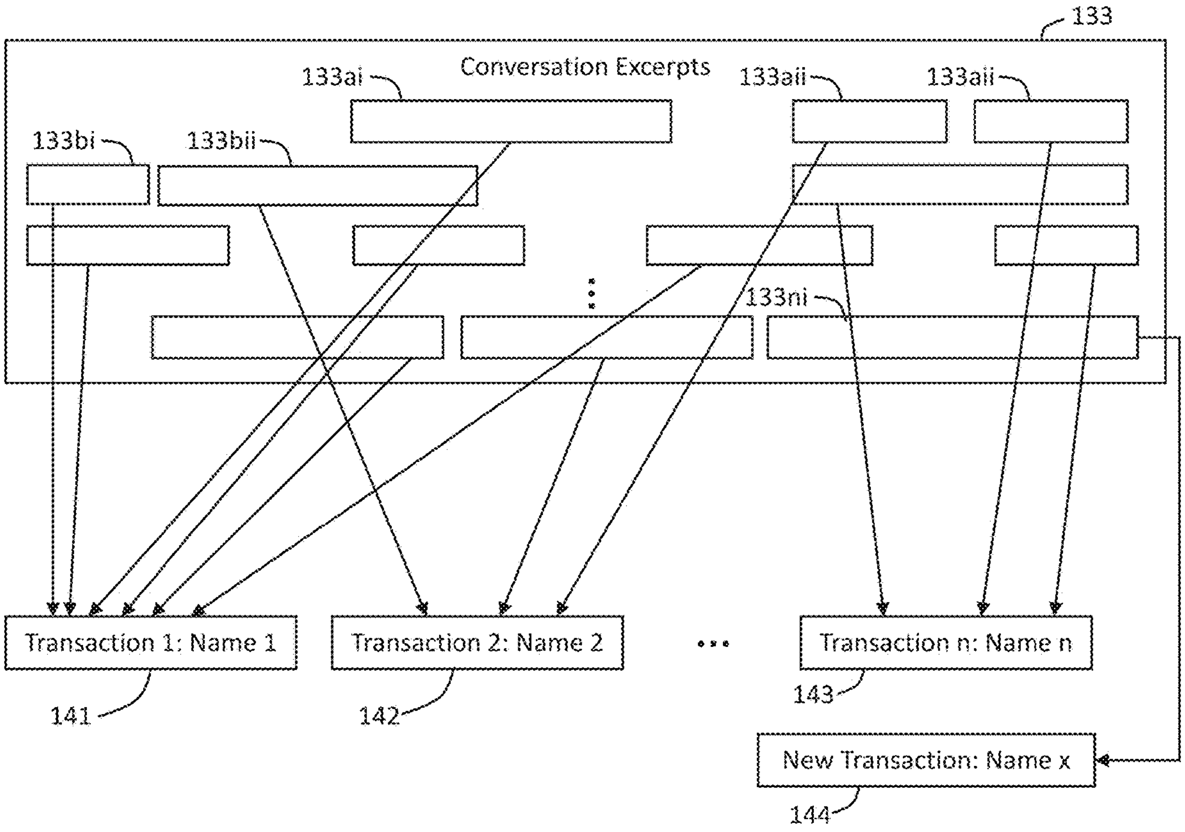

FIG. 1D illustrates a conversation excerpt mapping 134 generated by the conversation mapping engine 113 according to one embodiment. The conversation mapping engine 113 identifies (a) semantic content within the conversation excerpts 133, and (b) relationships among the semantic content and (i) each other and (ii) a set of candidate transactions 141-143. In the example illustrated in FIG. 1C, the conversation mapping engine 113 maps excerpts 133*ai* and 133*bi* to a first transaction 141 (transaction 1), which has a particular name (name 1). The conversation mapping engine 113 maps excerpts 133*aii* and 133*bii* to a second transaction 142 (transaction 2), which has a particular name (name 2). The conversation mapping engine 113 maps excerpt 133*aiii* to a third transaction 143 (transaction 3), which has a particular name (name 3). The conversation mapping engine 113 determines that the semantic content of excerpt 133*ni* is not associated with any existing candidate transaction 141-143. Accordingly, the conversation mapping engine 113 generates a new candidate transaction 144 having a particular name (name x). The conversation mapping engine 113 may generate the name for the new candidate transaction 144 based on the semantic content in the excerpt 133*ni*.

According to one or more embodiments, the conversation mapping engine 113 maps one excerpt to a particular candidate transaction based, in part, on the excerpt including a name of the particular candidate transaction in the semantic content of the excerpt. For example, the transaction 141 may have a name "December sales results," and the excerpt 133*ai* may include the words "December sales" as well as metadata indicating the conversation occurred in January. The conversation mapping engine 113 may map additional excerpts to the transaction 141, even when the additional excerpts do not include the name of the transaction 141. For example, the conversation classification model 112 may recognize the semantic content of the excerpt 133*ai* as scheduling a meeting to discuss December sales results. The conversation classification model 112 may further recognize the semantic content of the excerpt 133*bi*, associated with a different conversation on a different communication channel of a different channel type, as (a) including at least one participant in the conversation 131*a*, and (b) including content for a meeting at the same time as the meeting described in the semantic content of the excerpt 133*ai*. For example, the conversation excerpt 133*ai* may be an email to request a meeting, and the content: "please send my assistant the numbers for December." The conversation excerpt 133*bi* may be an instant message to the assistant with the content: "here are the spreadsheets for the meeting tomorrow." The conversation mapping engine 113 may analyze metadata including the identity of the assistant and semantic content including the date of the meeting and requested information to associate the conversation excerpt 133*bi*, which does not include a name of a particular candidate transaction, with conversation excerpt 133*ai* and the corresponding candidate transaction 141.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 8, titled "Computer Networks and Cloud Networks."

3. Channel-Based Conversation Classification

Figure 2:
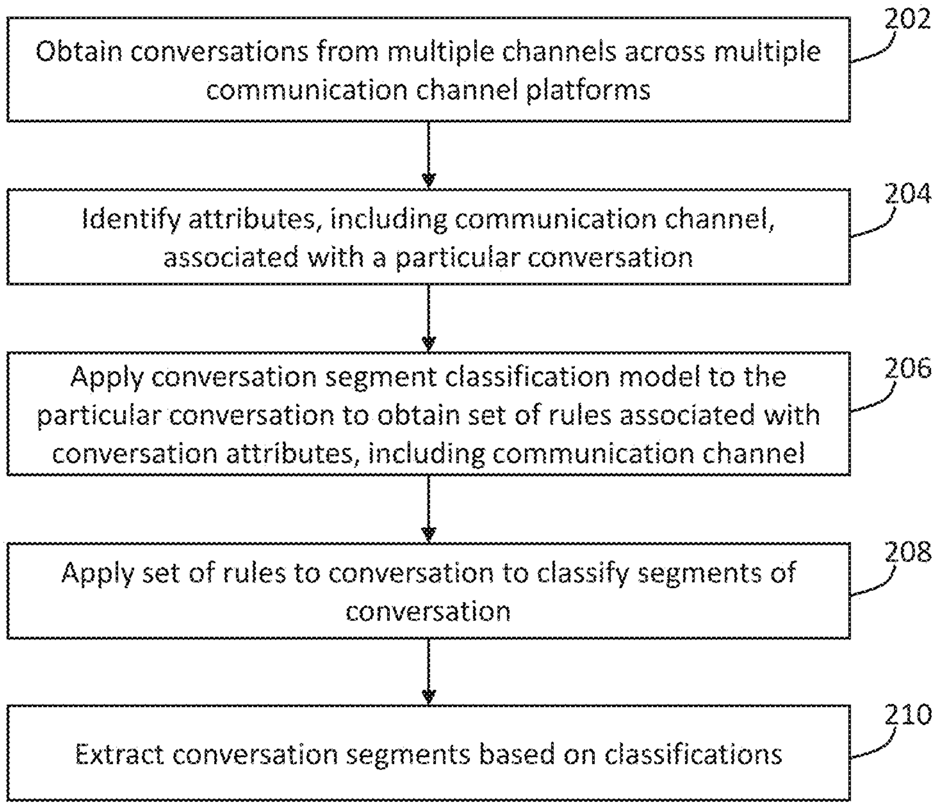
FIG. 2 illustrates an example set of operations for extracting conversation segments based on communication channel type in accordance with one or more embodiments.

FIG. 2 illustrates an example set of operations for classifying conversation segments from multiple different conversation channels and channel types based on a channel over which the conversation is conducted in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system obtains conversations from multiple channels across multiple communication channel platforms (Operation 202). The system may obtain multiple email conversations conducted over multiple different email threads and including different participants. The system may obtain multiple instant message conversations conducted over multiple different IM threads, each associated with a different set of participants. In one embodiment, the IM thread includes a particular channel name for each channel. Accordingly, channel participants may change over time by entering and leaving a channel of a particular channel name. The system may obtain SMS/MMS conversations conducted over multiple different SMS/MMS threads, each thread including a different set of cellular telephone numbers associated with the thread. The system may obtain multiple chat conversations conducted over multiple different chat applications, such as a chat associated with a website and a chat associated with an audio/video call application.

The system identifies attributes, including a communication channel, associated with a particular conversation (Operation 204). For example, the system may identify the particular communication channel (e.g., a particular SMS/MMS thread) and additional attributes, such as geography information, time information, or a thread name represented as metadata associated with the particular conversation.

The system applies a conversation segment classification model to the particular conversation to identify a set of rules associated with the attributes (Operation 206). For example, based on the conversation being conducted over one type of communication channel, the system may select one set of rules for generating, classifying, and filtering conversation segments. For example, a set of rules may determine which segments in a conversation should be filtered from the conversation, how long (e.g., how many words/sentences/semantic elements) a conversation segment should be, or how much time is allowed to elapse between communications in a conversation before a new conversation segment or a new conversation must be generated. Based on the conversation being conducted over another type of communication channel, the system may select another set of rules for generating, classifying, and filtering conversation segments.

The system applies the identified set of rules to the conversation to classify segments of the conversation (Operation 208). For example, the system may apply a set of rules to an email conversation to (a) filter content identified as not being relevant to any particular transaction, and (b) generate conversation segments of particular sizes, including content, or combinations of semantic elements, specified by the set of rules, and occurring over particular periods of time.

The system extracts conservation segments based on the classifications (Operation 210). For example, the system may extract three conversation segments from a conversation and filter out two conversation segments from the same conversation. The extracted conversation segments may be stored as in memory and indexed by a table to identify particular conversation segments beginning at particular locations in memory.

4. Multi-Channel Conversation Mapping

Figure 3:
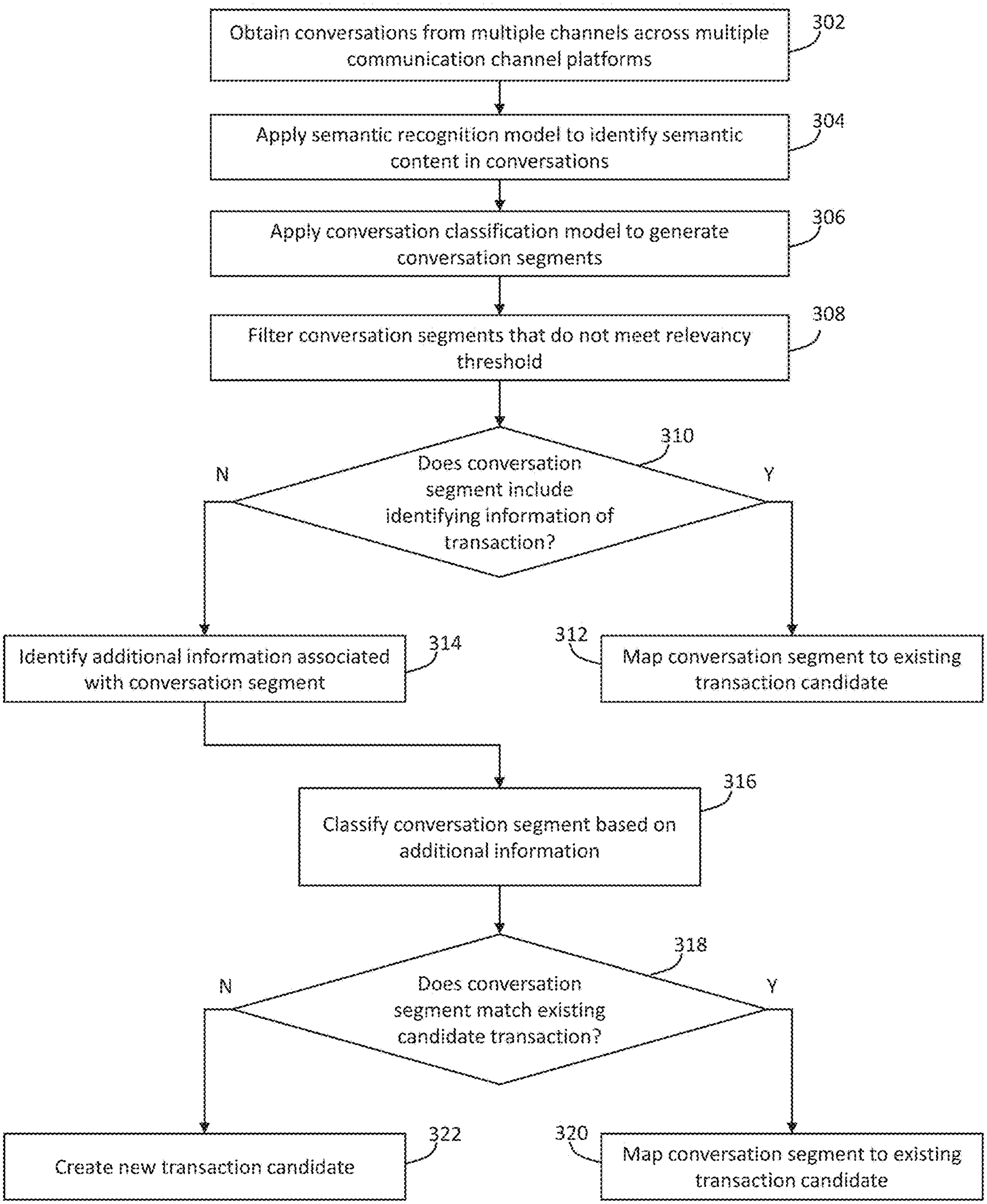
FIG. 3 illustrates an example set of operations for mapping conversation segments to transaction candidates in accordance with one or more embodiments.

FIG. 3 illustrates an example set of operations for classifying conversation segments from multiple different conversation channels and channel types based on a channel over which the conversation is conducted in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system obtains conversations from multiple channels across multiple communication channel platforms (Operation 302). The system may obtain multiple email conversations conducted over multiple different email threads and including different participants. The system may obtain multiple instant message conversations conducted over multiple different IM threads, each associated with a different set of participants. In one embodiment, the IM thread includes a particular channel name for each channel. Accordingly, channel participants may change over time by entering and leaving a channel of a particular channel name. The system may obtain SMS/MMS conversations conducted over multiple different SMS/MMS threads, each thread including a different set of cellular telephone numbers associated with the thread. The system may obtain multiple chat conversations conducted over multiple different chat applications, such as a chat associated with a website and a chat associated with an audio/video call application.

The system applies a semantic recognition model to identify semantic content in the conversations (Operation 304). The semantic recognition model receives as inputs alphanumeric content that comprises the conversation. The semantic recognition model may also receive as input metadata that may provide context for semantic content. In one or more embodiments, the semantic recognition model is implemented as a deep neural network (DNN), such as a deep convolutional neural network (CNN). The semantic recognition model identifies: words, how the words combine to form phrases, how the phrases combine to form sentences, and the meanings associated with the words, phrases, and sentences.

Based on the semantic content, a conversation classification model divides a conversation into segments based on the semantic content in different portions of the conversation (Operation 306). For example, a first portion of a conversation that contains semantic content associated with a participant's lunch is divided into one segment that is separate from an adjacent portion of the conversation that includes semantic content about a client matter. Another portion of the conversation may include semantic content associated with a personnel matter. The third portion may be divided into a conversation segment separate from the second portion (and an associated second conversation segment).

The system filters conversation segments that do not meet a relevancy threshold (Operation 308). Filtering a conversation segment may include labeling a conversation segment with a label indicating the segment should not be analyzed further to determine whether to map the segment to a particular candidate transaction. For example, a conversation segment including semantic content associated with small talk (e.g., the weather, traffic, sports, etc.), personal information (e.g., a participant's lunch, family, pets, entertainment, food), or current events that do not meet a relevancy threshold (e.g., national politics, news stories) may be assigned a label indicating the segment is "not relevant," "not likely relevant," "filtered," etc. It is understood that the name of the label is irrelevant, as long as the result is that the corresponding segment is omitted from mapping to a candidate transaction.

According to one or more embodiments, a relevancy threshold may be different according to a communication channel over which a conversation is conducted. For example, the system may assign a "not relevant" label to a conversation segment in a text SMS message that includes semantic content associated with a participant's location. The system may refrain from assigning the "not relevant" label to a similar conversation segment in a conversation occurring over an instant messaging application, where the conversation segment also includes the semantic content associated with the participant's location.

The system determines whether a particular conversation segment includes identifying information of a corresponding candidate transaction (Operation 310). For example, a conversation segment may include semantic content such as: "the XYZ company account," "a sales opportunity with XYZ," "candidate for the manager position," "production numbers for component X," or "deployment date at XYZ company."

If the conversation segment includes identifying information about a candidate transaction, the system maps the conversation segment to the candidate transaction (Operation 312). For example, the system may maintain a database including objects representing particular candidate transactions and locations in memory of conversation segments associated with the particular candidate transactions.

In some embodiments, the system analyzes metadata associated with a conversation segment to determine whether the conversation segment includes identifying information associated with a candidate transaction. For example, a cloud-based IM application may label each communication channel with a name. One name may be "sales opportunity with XYZ company." The system may determine that any conversation conducted on the channel named "sales opportunity with XYZ company" may be mapped to the corresponding candidate transaction. However, since a channel may include information that is not relevant to the name of the channel, the system may still analyze semantic content to determine whether conversation segments of a conversation on a channel "sales opportunity with XYZ company" should be mapped to the candidate transaction "sales opportunity with XYZ company." According to another example, an email may include a subject: "New project at Los Angeles site." An initial email in an email thread may include information associated with the new project. However, an email later in the email thread may include content associated with another project at a San Diego site. The system may apply a rule to associate conversation segments in the email thread with the candidate transaction "new project: Los Angeles," unless the semantic content in an email indicates the conversation segment should be associated with a different candidate transaction.

If the conversation segment does not include identifying information associated with a candidate transaction, the system identifies additional information associated with the conversation segment (Operation 314). The additional information includes semantic content in the conversation segment, and in surrounding conversation segments of the conversation, as well as metadata associated with the conversation segment. For example, the system may consider information such as: participants in the conversation (and whether the participants are associated with particular candidate transactions), a location described in a conversation segment, or an origin of a communication including the conversation segment, a language of the conversation segment, events, individuals, tasks, projects, and sets of data (such as data files, audio/visual files, etc.) associated with the conversation segment (and whether they are associated with particular candidate transaction).

Based on the semantic and/or metadata associated with a conversation segment, the system classifies the conversation segment (Operation 316). The classification may include, for example, a name of a transaction associated with the conversation segment.

The system determines whether the conversation segment matches an existing candidate transaction (Operation 318). For example, the system may store a set of candidate transactions, such as: "Sales opportunity: Company XYZ," "Sales opportunity: Company ABC," "System Upgrade: December Rollout," and "New Hire: Development Manager." The system may determine that a conversation segment categorized as "meeting with representative at Company XYZ re: new product line" matches the existing candidate transaction "Sales Opportunity: Company XYZ."

Based on determining that the conversation segment matches an existing candidate transaction, the system maps the conversation segment to the existing candidate transaction (Operation 320). For example, the system may maintain a table of candidate transactions and every conversation segment associated with the candidate transaction. The conversation segments may be mapped to memory locations, such that selection of a particular interface element of a graphical user interface (GUI) representing a particular candidate transaction retrieves content associated with the conversation segments mapped to a particular candidate transaction.

If the system determines that the conversation segment does not match an existing candidate transaction, the system may generate a new candidate transaction (Operation 322). For example, the system may determine that a particular conversation segment has a classification: "Upgrade at Boise Site." The system may determine that no candidate transaction presently exists that matches the classification. Accordingly, the system may generate a new candidate transaction named "Upgrade: Boise Site." The system may then map the conversation segment to the newly-created candidate transaction.

5. Machine Learning Model Training

Figure 4:
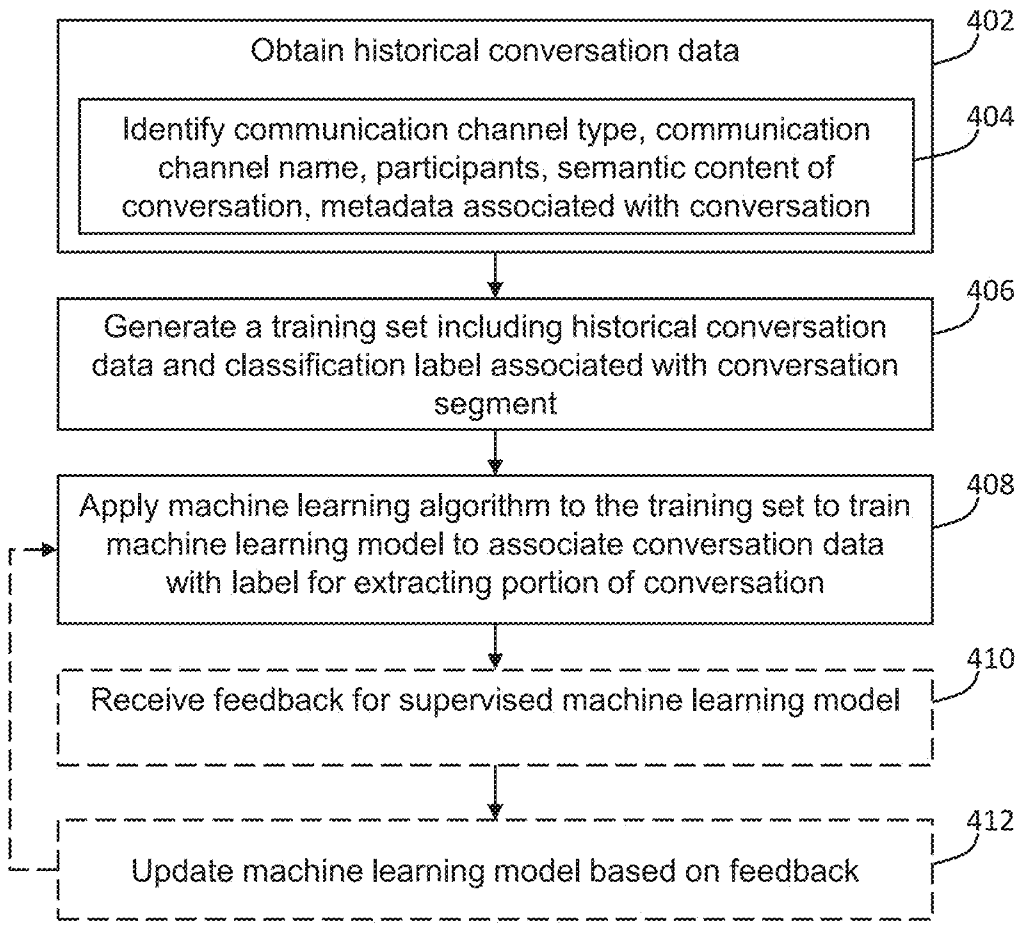
FIG. 4 illustrates an example set of operations for training a machine learning model to classify conversations in accordance with one or more embodiments.

FIG. 4 illustrates an example set of operations for training a machine learning model to classify conversation segments in accordance with one or more embodiments. Classifying the conversation segments may include a classification as "not relevant" to any candidate transaction to filter the conversation segment from a conversation. In addition, or in the alternative, the classification may include analyzing the semantic content and/or metadata associated with a conversation segment to identify a category-such as a topic-for the content of the conversation segment.

The method includes identifying or obtaining historical conversation data (Operation 402). Obtaining the historical data may include obtaining data associated with a type of communication channel, a particular communication channel, participants in conversations, semantic content of conversations, a language of a conversations, tags or symbols within the conversation, and metadata associated with the conversation, such as a date, time, source, destination, telephone numbers, channel name, email subject, etc. (Operation 404).

The system uses the historical conversation data to generate a set of training data (Operation 406). The set of training data includes, for each particular conversation segment in the historical conversation data, a classification label associated with the segment. For example, the training data identifies attributes including semantic values and metadata values associated with a conversation segment and a label associated with the segment. The label may include a description of content associated with the conversation segment, such as "meeting re: Product X," "bid to CEO X for deployment at facility Y," or "movie watched last night." According to one or more embodiment, the labels may include values for filtering particular conversation segments. For example, a label associated with a conversation segment discussing movies may include a value representing "not relevant to any particular transaction." The value may indicate that the conversation segment should be filtered from the conversation.

The system applies a machine learning algorithm to the training data set to perform an initial training of the machine learning model (Operation 408). The machine learning algorithm analyzes the training data set to train neurons of a neural network with particular weights and offsets to associate particular conversation data with particular labels. The particular labels may include content descriptions as well as predictions whether or not the content is relevant to any candidate transaction. According to one embodiment, the training data set incorporates rules for determining whether particular content is "relevant" or "not relevant" to any particular candidate transaction. The rules may apply different standards to conversations conducted on different types of channels. For example, both a conversation conducted via email and a conversation conducted via text SMS may include a discussion of weather. The training data set may include labels for conversation segments in the email communication channel type indicating that the conversation segments including content discussing weather have historically been labeled as "relevant." In contrast, the training data set may include labels for conversation segments in the SMS communication channel type indicating that the conversation segments including content discussing weather have historically been labeled as "not relevant." Accordingly, the machine learning model may be trained to generate different labels for the same types of conversations based on the channel type over which the conversations are conducted.

In embodiments in which the machine learning algorithm is a supervised machine learning algorithm, the system may optionally obtain feedback on the various aspects of the analysis described above (Operation 410). For example, the feedback may affirm or revise labels generated by the machine learning model. The machine learning model may indicate that a particular conversation segment, which may not include identifying information naming a particular candidate transaction, is associated with a first candidate transaction. The system may receive feedback indicating that the particular conversation segment should instead by associated with a second candidate transaction. According to another embodiment, the machine learning model may generate a label indicating that a particular conversation segment is "not relevant," and should be filtered from a conversation. The system may receive feedback indicating that the particular conversation segment is "relevant" and should be kept in the conversation. The feedback may additionally include a name of a candidate transaction to which the particular conversation segment is relevant to assist in training the machine learning model.

In some examples, the feedback may be restricted to those authorized to provide the feedback (operation 412).

Based on associations identified by the machine learning model and/or feedback, the machine learning training set may be updated, thereby improving its analytical accuracy. Once updated, the machine learning model may be further trained by optionally applying it to additional training data sets.

6. Example Embodiment: Channel-Based Conversation Classification

A detailed example is described below for purposes of clarity. Operations described below should be understood as one specific example which may not be applicable to certain embodiments. Accordingly, components and/or operations described below should not be construed as limiting the scope of any of the claims.

Figure 5A:
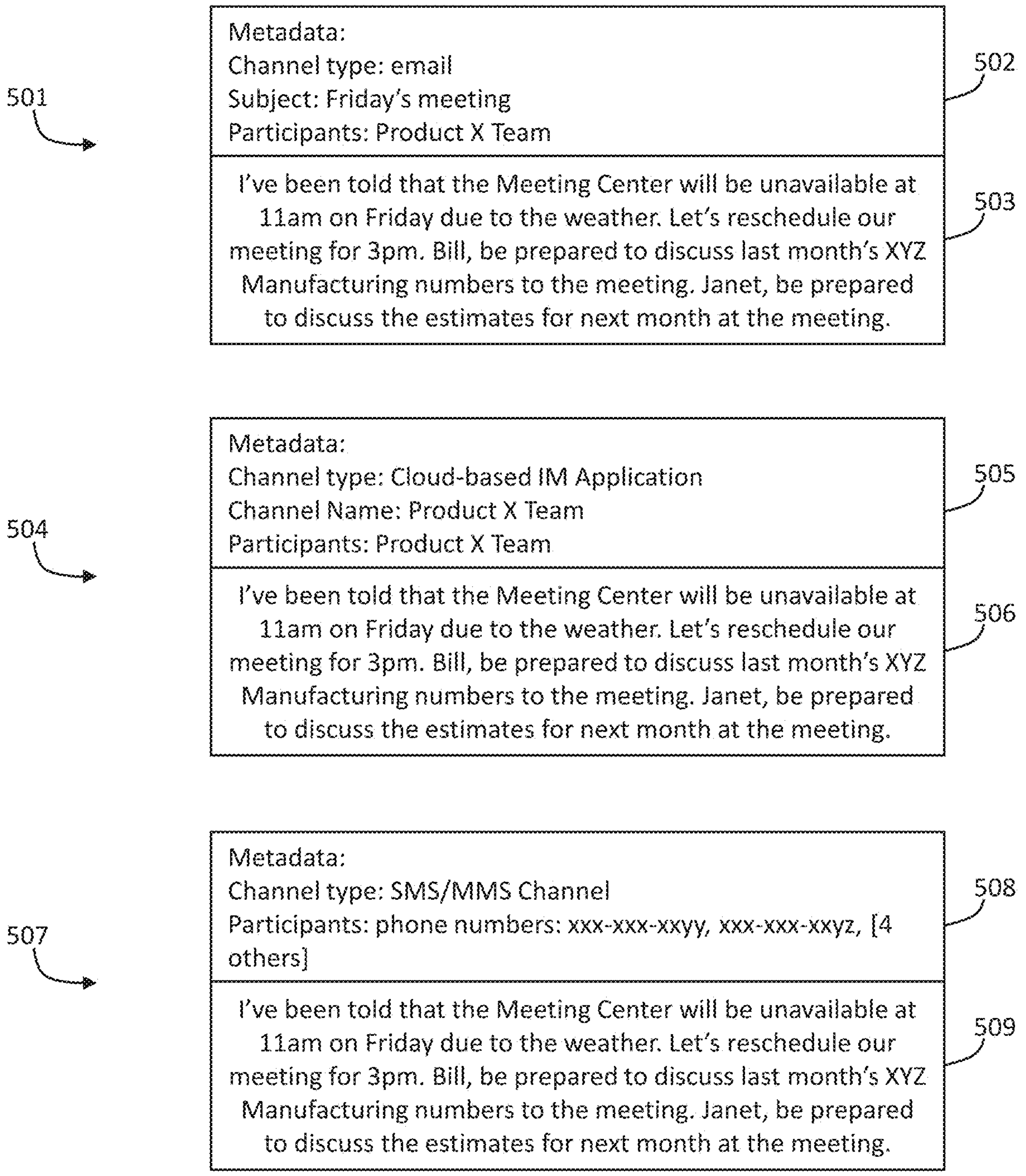
FIGS. 5A and 5B illustrate an example embodiment of classifying a conversation in multiple channels based on a channel type.

FIG. 5A illustrates a set of conversation messages 501, 504, and 507 carried out over three different communication channel types. Conversation message 501 is part of an email-type conversation. The conversation message 501 includes metadata 502 and message content 503. The metadata 502 includes, for example, data indicating a type of channel, email subject, and email participants. Conversation message 504 is part of a cloud-based instant-message (IM)-type conversation. The conversation message 504 includes metadata 505 and message content 506. The metadata 505 includes, for example, data indicating a type of channel, a channel name, and participants on the channel. Conversation message 507 is part of an SMS/MMS texting-type conversation including metadata 508 and message content 509. The metadata 508 includes, for example, data indicating a type of channel and phone numbers of participants on the channel.

Figure 5B:
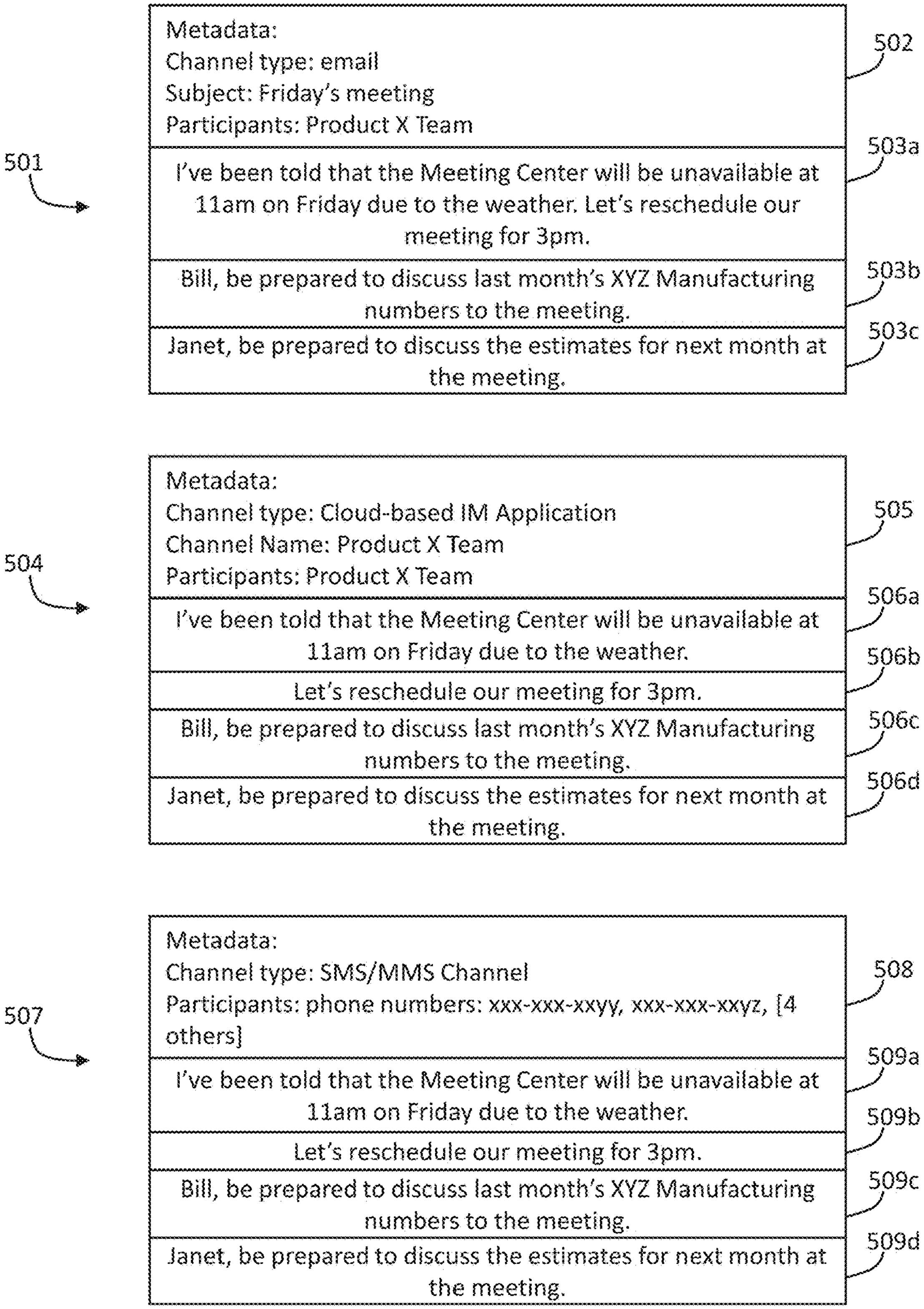

FIG. 5B illustrates a division of the message content 503, 506, and 509 into conversation segments by applying sets of rules that are different based on the types of communication channels over which the conversations are conducted. The rules are further based on semantic content in the conversations. A system applies a set of rules to divide the message content 503 into conversation segments 503*a*, 503*b*, and 503*c*. The system applies another set of rules to divide the message content 506 into conversation segments 506*a*, 506*b*, 506*c*, and 506*d*. The system applies yet another set of rules to divide the message content 509 into conversation segments 509*a*, 509*b*, 509*c*, and 509*d*. For example, the set of rules applied to conversation message 501 may specify that an email-type conversation channel may have conversation segments that include two or more sentences. The set of rules applied to conversation message 507 may specify that an SMS text-type conversation channel may have conversation segments of one sentence or less.

The system may further apply different sets of rules to the conversation segments 503*a*-503*c*, 506*a*-506*d*, and 509*a*-509*d* to categorize the conversation segments. For example, the system may apply one set of rules, associated with email-type communication channels, to categorize the conversation segment 503*a* as "Product X meeting scheduling"—"relevant"; conversation segment 503*b* as "Product X: XYZ manufacturing"—"relevant"; and conversation segment 503*c* as "Product X: sales estimates"—"relevant."

The system may apply another set of rules, associated with IM-type communication channels, to the conversation segments 506*a*-506*d* to categorize the conversation segments as: conversation segment 506*a* "Product X meeting information"—"not relevant"; conversation segment 506*b* as "Product X meeting scheduling"—"relevant"; conversation segment 506*c* as "Product X: XYZ manufacturing"—"relevant"; and conversation segment 506*d* as "Product X: sales estimates"—"relevant." The system may apply another set of rules, associated with SMS and MMS text messaging communication channels to the conversation segments 509*a*-509*d* to categorize the conversation segments as: conversation segment 509*a* "Product X meeting information"—"not relevant"; conversation segment 509*b* as "Product X meeting scheduling"—"not relevant"; conversation segment 509*c* as "Product X: XYZ manufacturing"—"relevant"; and conversation segment 509*d* as "Product X: sales estimates"—"relevant."

According to the example embodiment illustrated in FIGS. 5A and 5B, a system applies sets of rules to (a) divide conversations into conversation segments, and (b) categorize the conversation segments, based on the communication channel type over which the conversation is conducted. The sets of rules may be applied by training a machine learning model on training data sets that incorporate the sets of rules. Alternatively, the system may apply the rules by training a particular machine learning model to receive as an input semantic content, metadata, and a communication channel type, and to generate as an output the set of rules applicable to the particular conversation segment.

7. Example Embodiment: Multi-Channel Conversation Mapping

A detailed example of multi-channel conversation mapping is described below for purposes of clarity. Operations described below should be understood as one specific example which may not be applicable to certain embodiments. Accordingly, components and/or operations described below should not be construed as limiting the scope of any of the claims.

FIGS. 6A to 6E illustrate a set of conversations conducted over multiple communication channels of different types over a period of time.

Figure 6A:
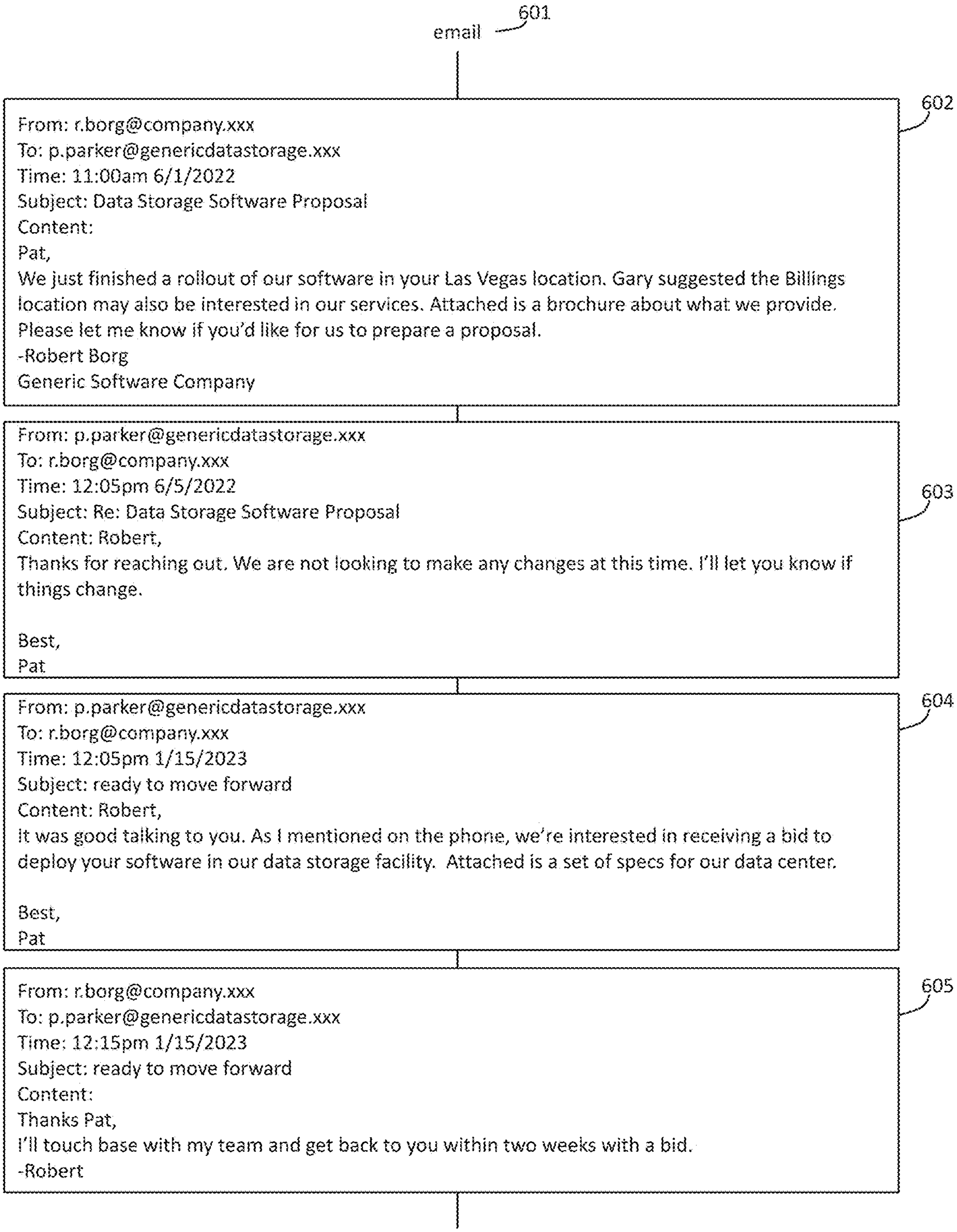
FIGS. 6A-6E illustrate an example embodiment of classifying and extracting conversation segments according to a conversation channel type.
Figure 6B:
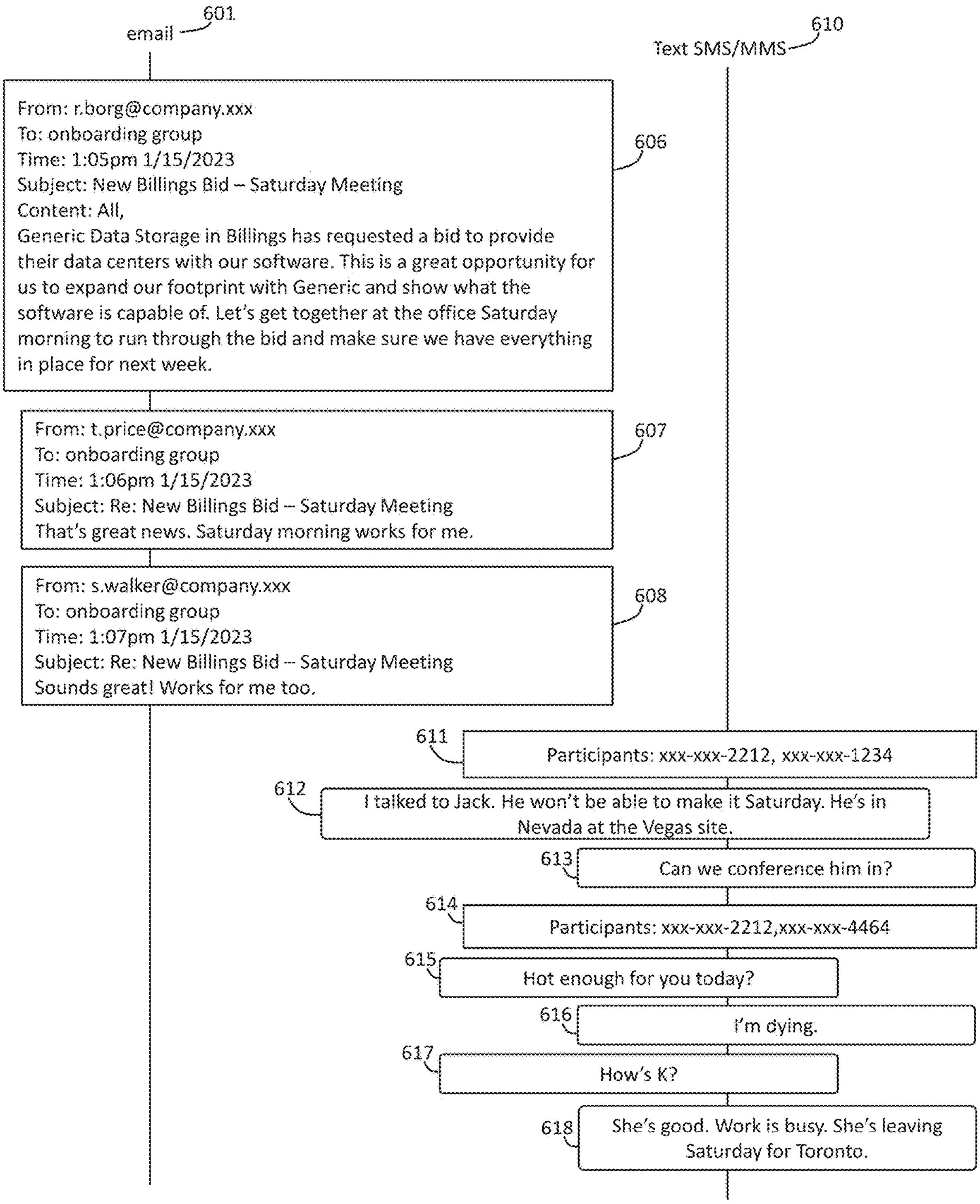
Figure 6C:
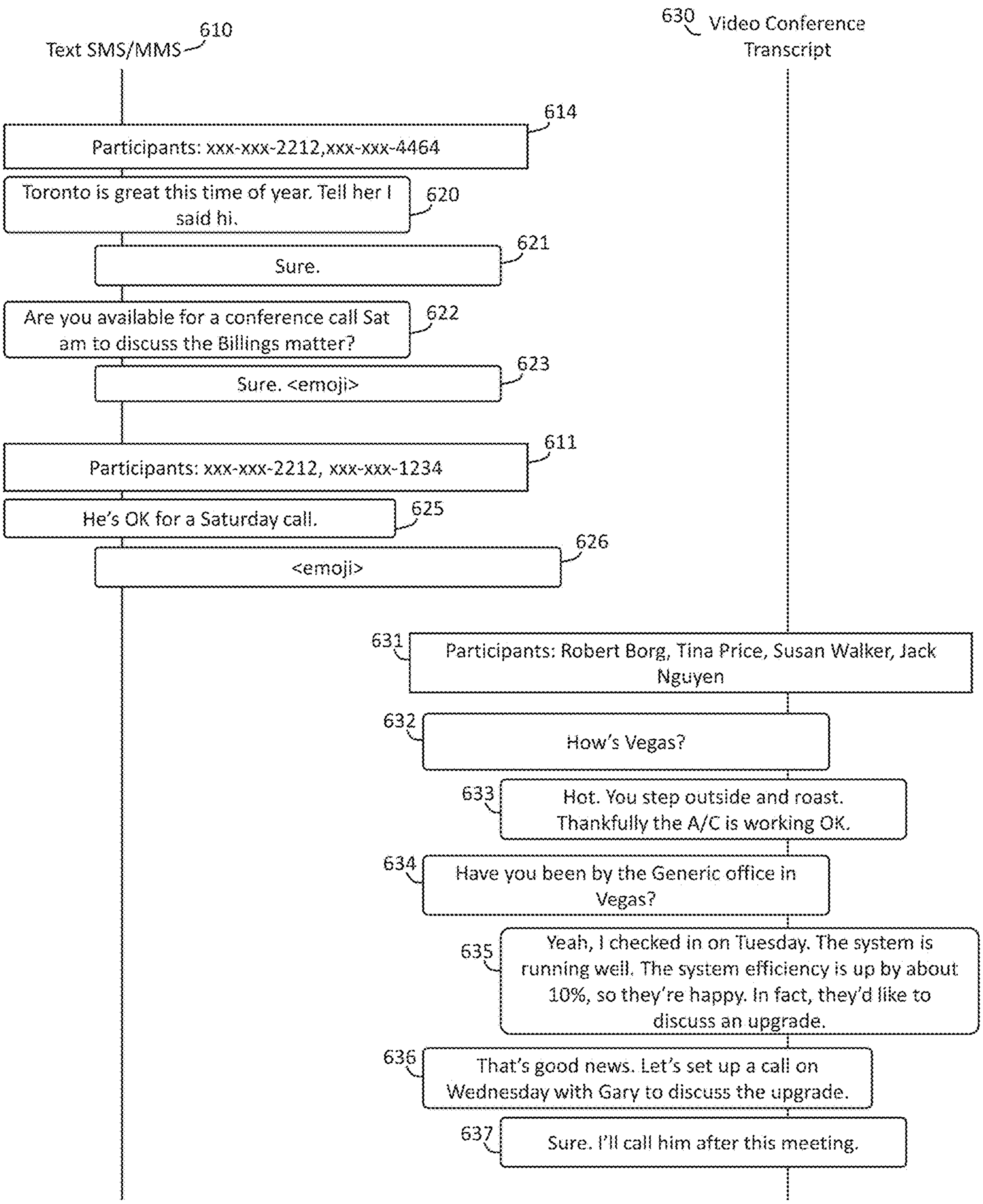
Figure 6D:
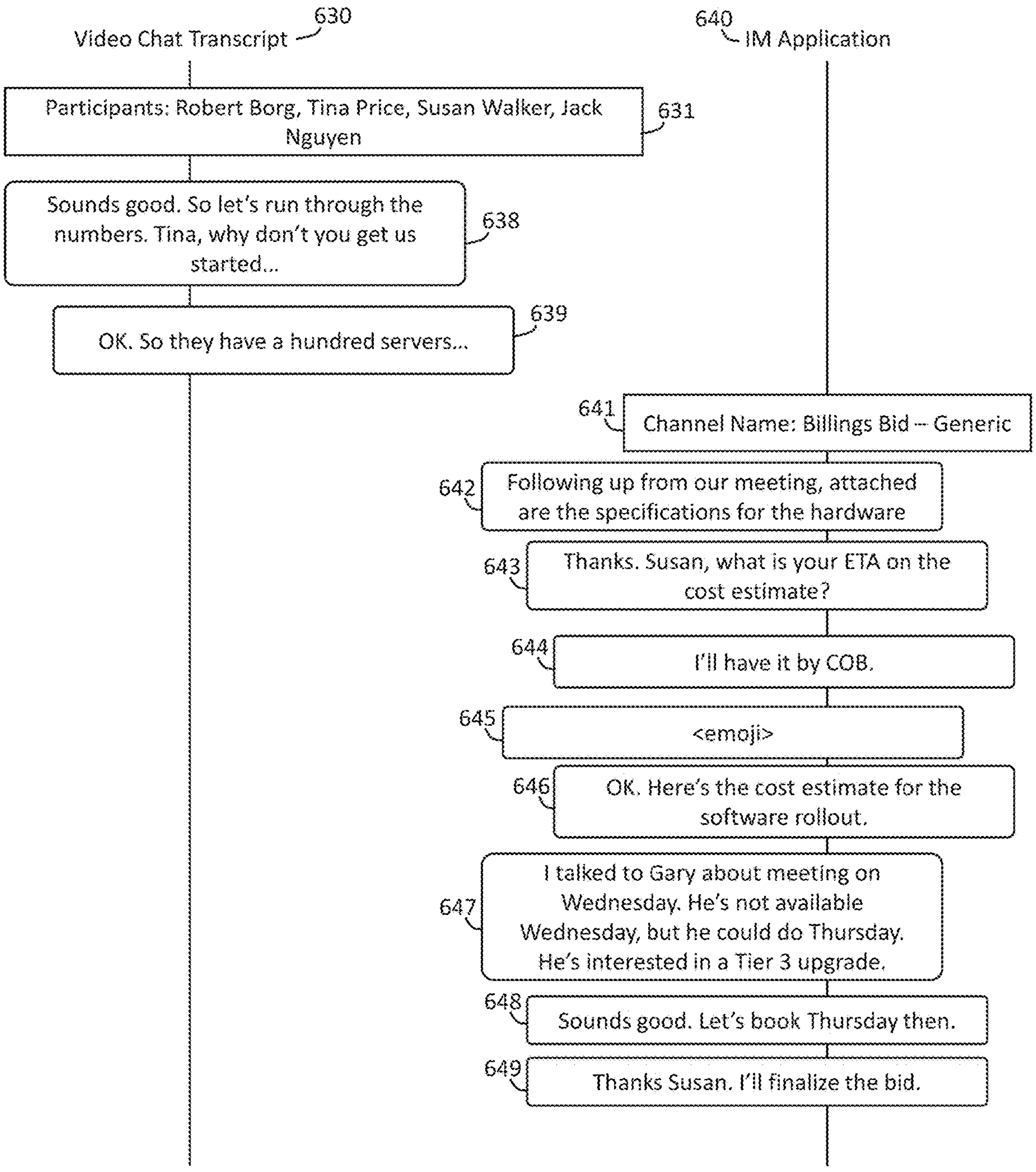
Figure 6E:
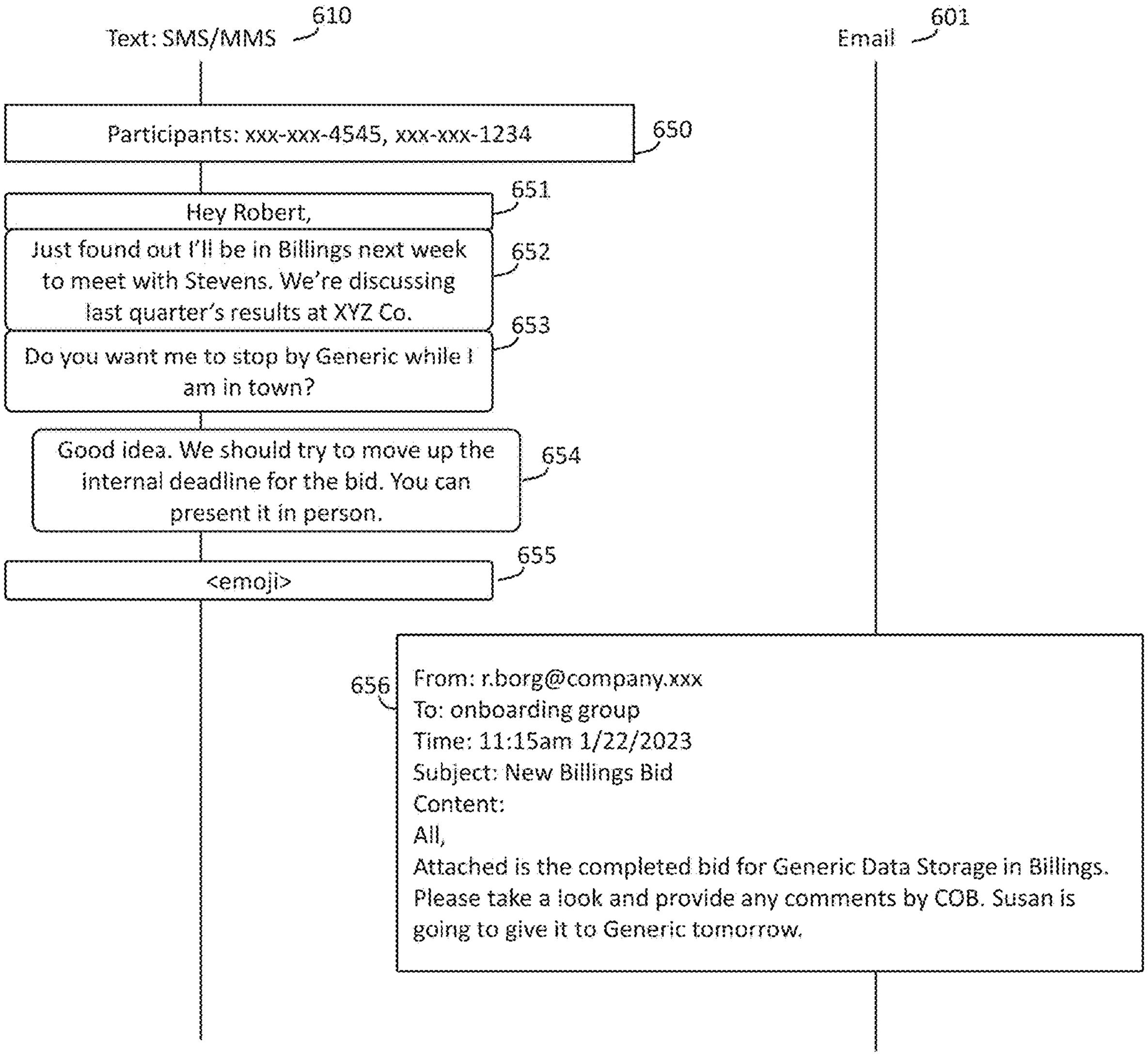

FIGS. 6A and 6B illustrate email messages 602-608 and 656 transmitted via an email channel type 601. The messages 602-608 may be sent over the same email application or over different email applications. The messages 603-608 are responses to the message 602 and are accordingly considered sent over the same email channel as message 602.

Messages 612, 613, 625, and 626 are text SMS/MMS messages sent over the text SMS/MMS channel 611 of the SMS/MMS channel type 610. Messages 615-623 are text SMS/MMS messages sent over the text SMS/MMS channel 614 of the SMS/MMS channel type 610.

Messages 632-639 are transcribed dialogue of a discussion conducted over a video conference channel of a video conference application channel type 630. Messages 642-649 are messages sent over a cloud-based IM channel 641 of an IM channel type 640.

A conversation interface platform stores the conversations from the different communication channels in a data repository. For example, the text SMS/MMS type messages may be generated using an application that transmits the conversations to a data repository for storage.

The conversation interface platform applies a semantic recognition machine learning model to the conversations stored in the data repository to recognize semantic content in the conversations. For example, the semantic recognition machine learning model is applied to the email thread including messages 602-608, which together comprise a conversation, to recognize semantic content in the conversation. Similarly, the semantic recognition machine learning model recognizes semantic content in the conversations comprising: messages 612-613, messages 615-623, messages 625-626, messages 632-639, messages 642-649, messages 651-655, and message 656.

The conversation interface platform applies one or more conversation classification machine learning models to classify conversation segments based on the semantic content in the conversations. Classifying the conversation segments may include: (a) dividing the conversations into conversation segments based on semantic content, (b) classifying the content in the conversation segments by applying labels to the conversation segments, and (c) filtering particular conversation segments from the conversation based determining the semantic content does not meet a threshold level of relevance to a transaction.

For example, a conversation classification machine learning model may identify emails 602-605 as being part of the same conversation, even though message 604 occurs 7 months after message 603. The conversation classification machine learning model may classify emails 602-605 as being in the same conversation based on attributes including: being trained on a data set that allows email messages to be classified as part of the same conversation over any duration of time, emails responding to an initial email tend to be in a same conversation, and semantic content of the email 604 is related to the semantic content in email 602. Based on identifying messages 602-605 as being part of the same conversation, the conversation classification machine learning model generates a set of conversation segments, such as: "We just finished a rollout of our software in your Las Vegas location." "Gary suggested the Billings location may also be interested in our services." "Attached is a brochure about what we provide. Please let me know if you'd like for us to prepare a proposal." "Thanks for reaching out." "We are not looking to make any changes at this time." "I'll let you know if things change." The system may generate classifications for the conversation segments, such as "software rollout," "Gary referral," "brochure," "proposal," "thanks," etc. The conversation classification machine learning model may further classify one or more conversation segments as not meeting a relevancy threshold to filter the conversation segments from the conversation. For example, the conversation classification model may further label the conversation segment: "Thanks for reaching out" with a label "not relevant" based on determining that the conversation segment does not meet a relevancy threshold to any particular transaction.

The conversation classification machine learning model classifies the additional conversations conducted over additional communication channels, including the SMS/MMS text conversations, video conference conversation, and IM conversation. The conversation classification machine learning model divides the conversations into conversation segments, labels the conversation segments based on semantic and/or metadata content, and filters conversation segments based on the segments failing to meet a threshold level of relevance.

Based on the content classification, a conversation mapping engine maps conversation segments to one or more candidate transactions. The conversation mapping engine may determine whether the semantic and/or metadata content of a conversation includes names and/or identifying information of a candidate transaction. If so, the conversation mapping engine may map a conversation segment to the transaction associated with the name and/or identifying information. If a conversation segment does not include the name and/or identifying information of a candidate transaction, the conversation mapping engine analyzes additional attributes of the conversation segment to identify a relationship of the conversation segment to other conversation segments and to a candidate transaction.

For example, based on the semantic content in email message 602, the system identifies the conversation segments in email message 602 as being associated with a candidate transaction "Sales Opportunity: GenericDataStorageBillings." The system determines that the candidate transaction does not exist. Accordingly, the system generates a new candidate transaction with the name "Sales Opportunity: GenericDataStorageBillings." Unlike email message 602, the content in email message 603 does not include any identifying information associated with a candidate transaction. However, the system identifies the email subject and participants of email message 603 as being the same as email message 602. In addition, the system identifies the semantic content of email message 603 as being related to the semantic content in email message 602. Accordingly, even though email message 603 does not include any name or identifying information associated with the candidate transaction "Sales Opportunity: GenericDataStorageBillings" within the content of the email message 603, the system recognizes the conversation segments of email message 603 as being related to the candidate transaction based on the relationship of email message 603 to email message 602.

Email message 604 occurs 7 months after email message 603 and also does not include any identifying information (such as a transaction name) associated with a candidate transaction. In addition, the metadata associated with email message 604 includes a "subject" that is different from email messages 602 and 603. However, the system identifies the participants of email message 604 as being the same as email messages 602 and 603. In addition, the system identifies the semantic content of email message 604 as being related to the semantic content in email messages 602 and 603. Accordingly, even though email message 604 does not include any name or identifying information associated with the candidate transaction "Sales Opportunity: GenericDataStorageBillings" within the content of the email message 604, the system recognizes the conversation segments of email message 604 as being related to the candidate transaction based on the relationship of email message 604 to email message 602.

SMS message 612 occurs over a different communication channel type than email messages 602-608 and also does not include any identifying information (such as a transaction name) associated with a candidate transaction. In fact, SMS message 612 includes location information associated with a different candidate transaction (e.g., "He's in Nevada at the Vegas site.") However, the system identifies the participants associated with the phone numbers ending in -2212 and -1234 as also being participants in the email 606. In addition, the system determines that the participant "Jack" was also a participant in the email 606, and the semantic content (e.g., reference to "Saturday") of a portion of message 612 is related to the semantic content of email 606. Based on the identified correlations between the SMS message 612 and the email 606, the system maps the SMS messages 612 and 613 to the candidate transaction "Sales Opportunity: Generic DataStorageBillings."

The system identifies semantic content within the conversation comprising SMS/MMS messages 615-623 that is related to the candidate transaction "Sales Opportunity: GenericDataStorageBillings." In particular, SMS message 622 references "the Billings matter." In addition, the system identifies the participants with the phone numbers ending in -2212 and -1234 as also being participants in the email 606. In addition, the system recognizes the semantic content in messages 615 (referring to the hot weather, associated with Las Vegas) and 622 as being related to the semantic content of the conversation comprising SMS messages 612 and 613. The system further identifies messages 615-621 as being "small talk" and filters the messages out of the conversation for purposes of a mapping analysis. The system further recognizes the semantic intent of the emoji in message 623 as conveying agreement. Accordingly, the system identifies the message 623 as being related to message 622. Based on the metadata associated with the messages 622 and 623 (e.g., phone numbers/participants), and the semantic content in the messages 622 and 623, the system maps the conversation segments associated with messages 622 and 623 to the candidate transaction "Sales Opportunity: GenericDataStorageBillings."

The system analyzes the conversation comprising messages 632-639 (and more, as represented by an ellipses) and maps portions of the conversation to the candidate transaction "Sales Opportunity: GenericDataStorageBillings." For example, the system recognizes that the participants in the video conference are also participants in email 606, associated with the candidate transaction "Sales Opportunity: GenericDataStorageBillings." The system recognizes that the email 606 references a Saturday meeting and recognizes metadata associated with the video conference indicating the video conference occurred at the specified time on Saturday. In addition, the system may recognize semantic content within the conversation comprising messages 638-639 (and more, as represented by the ellipses) that is related to the candidate transaction. However, even though the video conference is related to one candidate transaction, the system also recognizes portions of the video conference that are related to another candidate transaction. For example, the system may identify the semantic content in messages 632, 634, and 635 as being related to an existing candidate transaction: "Software Rollout: GenericDataStorageLas Vegas." The system may further identify semantic content in messages 635 and 636 associated with a new candidate transaction: "Software Upgrade: GenericDataStorageLas Vegas." The system may divide the message 635 into multiple conversation segments based on the semantic content in the message 635. For example, the system may generate one conversation segment: "The system is running well. The system efficiency is up by about 10%, so they're happy" and another conversation segment: "In fact, they'd like to discuss an upgrade." Based on the analysis of semantic content and metadata associated with conversation segments, the conversation classification machine learning model and conversation mapping engine may map: (a) conversation segments across different communication channel types to a same candidate transaction, (b) conversation segments within a same conversation of a same communication channel to different candidate transactions.

Based on the analysis of semantic content and metadata associated with conversation segments, the conversation classification machine learning model and conversation mapping engine may further map (a) conversation segments in one communication channel of one communication channel type, that do not include semantic content identifying a particular candidate transaction, and (b) conversation segments in another, different, communication channel of another, different, communication channel type, that does include semantic content identifying a particular candidate transaction, to the same candidate transaction. The conversation mapping engine may map the different conversation segments to the same candidate transaction by identifying correlations between conversation segments in one channel, that do not include identifying information of the candidate transaction, with one or more conversation segments in another channel, that do include identifying information.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
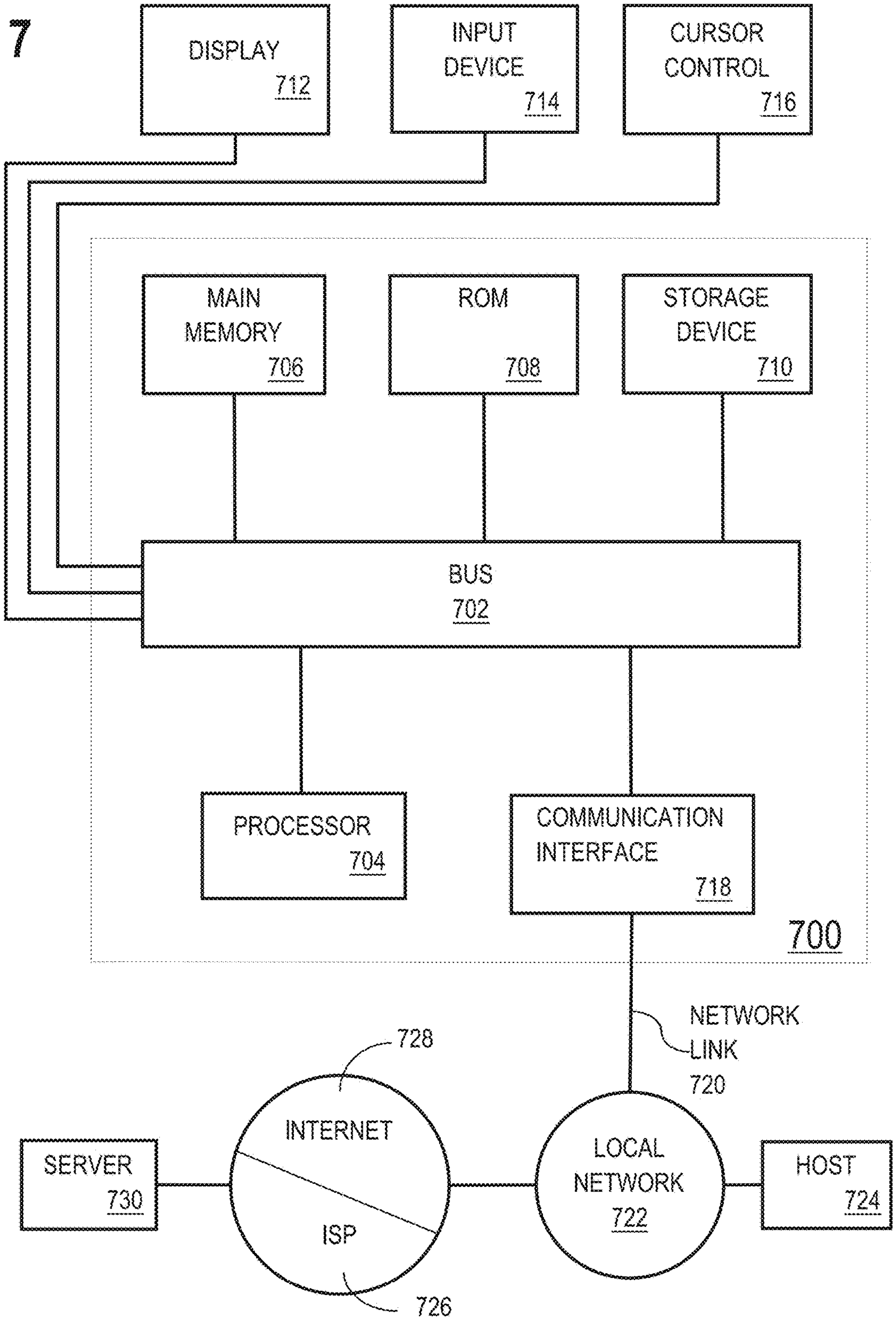
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors cause performance of operations comprising:
 - identifying a first conversation conducted over a first communication channel type of a plurality of communication channel types;
 - applying a semantic recognition model to the first conversation to encode the first conversation based on semantic content of the first conversation;
 - identifying a second conversation conducted over a second communication channel type of the plurality of communication channel types;
 - applying the semantic recognition model to the second conversation to encode the second conversation based on the semantic content of the second conversation;
 - based on encoding the first conversation and the second conversation by the semantic recognition model:
   - identifying a first segment of the first conversation conducted over the first communication channel type and a second segment of the second conversation conducted over the second communication channel type as corresponding to a first transaction;
   - responsive to the first segment corresponding to the first transaction: identifying a first set of channel-specific rules associated with the first communication channel type, the first set of channel-specific rules specifying a first set of parameters for extracting first content from the first conversation;
   - responsive to the second segment corresponding to the first transaction: identifying a second set of channel-specific rules associated with the second communication channel type, the second set of channel-specific rules specifying a second set of parameters for extracting second content from the second conversation, wherein the second set of parameters is different than the first set of parameters;
 - extracting the first segment based on the first set of channel-specific rules; and
 - extracting the second segment based on the second set of channel-specific rules; and
 - populating a database with (a) a first mapping of the first segment, extracted from the first communication channel type based on the first set of channel-specific rules, and (b) a second mapping of the second segment, extracted from the second communication channel type based on the second set of channel-specific rules, to the first transaction.

2. The non-transitory computer readable media of claim 1, wherein the semantic recognition model is an encoding-type deep learning machine learning model that transforms text content into numerical representations.

3. The non-transitory computer readable media of claim 1, wherein identifying the first segment and the second segment as corresponding to the first transaction comprises applying a trained classification-type machine learning model to the first conversation encoded by the semantic recognition model and the second conversation encoded by the semantic recognition model, and
 - wherein the trained classification-type machine learning model classifies the first segment and the second segment as corresponding to the first transaction.

4. The non-transitory computer readable media of claim 3, wherein the operations further comprise:
 - training a classification-type machine learning model to classify encoded segments of conversations at least by:
   - obtaining a first training data set of historical conversation data for a plurality of conversations, the first training data set of historical conversation data comprising:
     - a third conversation;
     - a communication channel type, of the plurality of communication channel types, over which the third conversation was conducted; and
     - a label classifying a first portion of the third conversation;
   - applying the first training data set to the classification-type machine learning model to generate the trained classification-type machine learning model.

5. The non-transitory computer readable media of claim 1, wherein the operations further comprise:
 - identifying a third segment of the first conversation conducted over the first communication channel type as corresponding to a second transaction;
 - extracting the third segment; and
 - populating the database with a third mapping of the third segment to the second transaction.

6. The non-transitory computer readable media of claim 1, wherein the operations further comprise:
 - identifying a third segment of the first conversation conducted over the first communication channel type; and
 - refraining from populating the database with the third segment.

7. The non-transitory computer readable media of claim 6, wherein refraining from populating the database with the third segment is based at least on a classification-type machine learning model identifying the third segment as not corresponding to any particular transaction.

8. The non-transitory computer readable media of claim 6, wherein the operations further comprise:
 - identifying a fourth segment of a third conversation conducted over a third communication channel type;
 - identifying first semantic content in the first segment;
 - identifying the first semantic content in the fourth segment; and
 - refraining from extracting the fourth segment to populate the database with the fourth segment, wherein extracting the first segment and populating the database with the first segment are based at least on the first semantic content and the first communication channel type, and wherein refraining from extracting the fourth segment to populate the database with the third segment are based at least on the first semantic content and the third communication channel type.

9. The non-transitory computer readable media of claim 1, wherein extracting the first segment comprises: extracting a first portion of a first length of the first conversation based on the first communication channel type, and
 - wherein extracting the second segment comprises: extracting a second portion of a second length of the second conversation based on the second communication channel type, wherein the second length is different from the first length.

10. The non-transitory computer readable media of claim 1, wherein the first segment and the second segment correspond to a same first semantic content, and wherein applying the first set of channel-specific rules to the first segment and applying the second set of channel-specific rules to the second segment results in a different extraction outcome.

11. The non-transitory computer readable media of claim 1, wherein the first set of channel-specific rules specifies that a first conversation segment comprising first semantic content associated with a geographic location is not extracted for populating the database, and wherein the second set of channel-specific rules specifies that a second conversation segment comprising the first semantic content associated with the geographic location is extracted for populating the database.

12. The non-transitory computer readable media of claim 1, wherein the first set of channel-specific rules specifies a first maximum elapsed time between communications for classifying two or more communications as part of a same conversation segment, and wherein the second set of channel-specific rules specifies a second maximum elapsed time between communications for classifying two or more communications as part of the same conversation segment, wherein the second maximum elapsed time is different from the first maximum elapsed time.

13. The non-transitory computer readable media of claim 1, wherein the first set of channel-specific rules specifies that a first conversation segment comprising personal information content is extracted for populating the database, and wherein the second set of channel-specific rules specifies that the first conversation segment comprising the personal information content is not extracted for populating the database.

14. A method comprising:

identifying a first conversation conducted over a first communication channel type of a plurality of communication channel types;

applying a semantic recognition model to the first conversation to encode the first conversation based on semantic content of the first conversation;

identifying a second conversation conducted over a second communication channel type of the plurality of communication channel types;

applying the semantic recognition model to the second conversation to encode the second conversation based on the semantic content of the second conversation;

based on encoding the first conversation and the second conversation by the semantic recognition model:

identifying a first segment of the first conversation conducted over the first communication channel type and a second segment of the second conversation conducted over the second communication channel type as corresponding to a first transaction;

responsive to the first segment corresponding to the first transaction: identifying a first set of channel-specific rules associated with the first communication channel type, the first set of channel-specific rules specifying a first set of parameters for extracting first content from the first conversation;

responsive to the second segment corresponding to the first transaction: identifying a second set of channel-specific rules associated with the second communication channel type, the second set of channel-specific rules specifying a second set of parameters for extracting second content from the second conversation, wherein the second set of parameters is different than the first set of parameters;

extracting the first segment based on the first set of channel-specific rules; and extracting the second segment based on the second set of channel-specific rules; and populating a database with (a) a first mapping of the first segment, extracted from the first communication channel type based on the first set of channel-specific rules, and (b) a second mapping of the second segment, extracted from the second communication channel type based on the second set of channel-specific rules, to the first transaction.

15. The method of claim 14, wherein the semantic recognition model is an encoding- type deep learning machine learning model that transforms text content into numerical representations.

16. The method of claim 14, wherein identifying the first segment and the second segment as corresponding to the first transaction comprises applying a trained classification-type machine learning model to the first conversation encoded by the semantic recognition model and the second conversation encoded by the semantic recognition model, and wherein the trained classification-type machine learning model classifies the first segment and the second segment as corresponding to the first transaction.

17. The method of claim 16, wherein further comprising:

training a classification-type machine learning model to classify encoded segments of conversations at least by:

obtaining a first training data set of historical conversation data for a plurality of conversations, the first training data set of historical conversation data comprising:

a third conversation;

a communication channel type, of the plurality of communication channel types, over which the third conversation was conducted; and a label classifying a first portion of the third conversation;

applying the first training data set to the classification-type machine learning model to generate the trained classification-type machine learning model.

18. The method of claim 14, further comprising:

identifying a third segment of the first conversation conducted over the first communication channel type as corresponding to a second transaction;

extracting the third segment; and populating the database with a third mapping of the third segment to the second transaction.

19. The method of claim 14, further comprising:

identifying a third segment of the first conversation conducted over the first communication channel type; and refraining from populating the database with the third segment.

20. The method of claim 19, wherein refraining from populating the database with the third segment is based at least on a classification-type machine learning model identifying the third segment as not corresponding to any particular transaction.

21. The method of claim 19, further comprising:

identifying a fourth segment of a third conversation conducted over a third communication channel type;

identifying first semantic content in the first segment;

identifying the first semantic content in the fourth segment; and refraining from extracting the fourth segment to populate the database with the fourth segment, wherein extracting the first segment and populating the database with the first segment are based at least on the first semantic content and the first communication channel type, and wherein refraining from extracting the fourth segment to populate the database with the fourth segment are based at least on the first semantic content and the third communication channel type.

22. The method of claim 14, wherein extracting the first segment comprises:

extracting a first portion of a first length of the first conversation based on the first communication channel type, and wherein extracting the second segment comprises: extracting a second portion of a second length of the second conversation based on the second communication channel type, wherein the second length is different from the first length.

23. A system comprising:

one or more processors; and memory storing instructions that, when executed by the one or more processors, cause the system to perform operations comprising:

identifying a first conversation conducted over a first communication channel type of a plurality of communication channel types;

applying a semantic recognition model to the first conversation to encode the first conversation based on semantic content of the first conversation;

identifying a second conversation conducted over a second communication channel type of the plurality of communication channel types;

applying the semantic recognition model to the second conversation to encode the second conversation based on the semantic content of the second conversation;

based on encoding the first conversation and the second conversation by the semantic recognition model:

identifying a first segment of the first conversation conducted over the first communication channel type and a second segment of the second conversation conducted over the second communication channel type as corresponding to a first transaction;

responsive to the first segment corresponding to the first transaction: identifying a first set of channel-specific rules associated with the first communication channel type, the first set of channel-specific rules specifying a first set of parameters for extracting first content from the first conversation;

responsive to the second segment corresponding to the first transaction: identifying a second set of channel-specific rules associated with the second communication channel type, the second set of channel-specific rules specifying a second set of parameters for extracting second content from the second conversation, wherein the second set of parameters is different than the first set of parameters;

extracting the first segment based on the first set of channel-specific rules; and extracting the second segment based on the second set of channel-specific rules; and populating a database with (a) a first mapping of the first segment, extracted from the first communication channel type based on the first set of channel-specific rules, and (b) a second mapping of the second segment, extracted from the second communication channel type based on the second set of channel-specific rules, to the first transaction.

24. The system of claim 23, wherein identifying the first segment and the second segment as corresponding to the first transaction comprises applying a trained classification-type machine learning model to the first conversation encoded by the semantic recognition model and the second conversation encoded by the semantic recognition model, and wherein the trained classification-type machine learning model classifies the first segment and the second segment as corresponding to the first transaction.

* * * * *